US011120822B2

(12) United States Patent
Ohtake et al.

(10) Patent No.: US 11,120,822 B2
(45) Date of Patent: Sep. 14, 2021

(54) MAGNETIC DISK DRIVE AND HEAD ADJUSTING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Masaya Ohtake, Kanagawa (JP); Akihiko Takeo, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/003,728

(22) Filed: Aug. 26, 2020

(65) Prior Publication Data
US 2021/0256996 A1   Aug. 19, 2021

(30) Foreign Application Priority Data

Feb. 19, 2020  (JP) .............................. JP2020-026019

(51) Int. Cl.
*G11B 19/04*   (2006.01)
*G11B 33/10*   (2006.01)
(Continued)

(52) U.S. Cl.
CPC .............. *G11B 5/012* (2013.01); *G11B 5/02* (2013.01); *G11B 5/1278* (2013.01)

(58) Field of Classification Search
CPC .............. G11B 27/36; G11B 20/10009; G11B 20/1258; G11B 2020/1278; G11B 5/09; G11B 7/126; G11B 7/1267; G11B 7/0045; G11B 20/1403; G11B 27/24; G11B 7/131; G11B 19/04; G11B 33/10; G11B 2/10305; G11B 5/00; G11B 20/12; G11B 20/18; G11B 15/02; G11B 19/02; G11B 5/52; G11B 5/54; G11B 15/0005
(Continued)

(56) References Cited

U.S. PATENT DOCUMENTS 6,956,710 B2   10/2005 Yun et al.
8,630,052 B1*  1/2014 Jung .................. G11B 5/59655
                                              360/55

(Continued)

*Primary Examiner* — Nabil Z Hindi
(74) *Attorney, Agent, or Firm* — Kim & Stewart LLP

(57) ABSTRACT

A magnetic disk drive includes first and second disks having respective first and second surfaces, a first head including a first write head that writes data on the first surface at a first recording density, and a first assist element that generates a first energy for increasing a write performance by the first write head, a second head including a second write head that writes data on the second surface at a second recording density, and a second assist element that generates a second energy for increasing a write performance by the second write head, and a controller that changes one of the first and second recording densities based on a first recording capacity up to which the first head is capable of writing on the first disk, a second recording capacity up to which the second head is capable of writing on the second disk, and a target capacity.

19 Claims, 12 Drawing Sheets

(51) Int. Cl.
*G11B 20/10* (2006.01)
*G11B 5/012* (2006.01)
*G11B 5/127* (2006.01)
*G11B 5/02* (2006.01)

(58) Field of Classification Search
USPC ...... 360/48, 75, 77.01, 53, 77.06; 369/53.42
See application file for complete search history.

(56) References Cited

U.S. PATENT DOCUMENTS

| | | |
|---|---|---|
| 8,810,954 B1 | 8/2014 | Taguchi et al. |
| 9,082,458 B1 * | 7/2015 | Tang ................ G11B 20/10009 |
| 9,230,605 B1 * | 1/2016 | Moser .................... G11B 27/36 |
| 9,870,789 B2 | 1/2018 | Funayama |

* cited by examiner

| Head | ASSIST AMOUNT | UPPER LIMIT ASSIST AMOUNT | RATIO |
|---|---|---|---|
| 15-0 | AS0 | MA0 | 65% |
| 15-1 | AS1 | MA1 | 86% |
| 15-2 | AS2 | MA2 | 79% |
| 15-3 | AS3 | MA3 | 70% |
| ⋮ | ⋮ | ⋮ | ⋮ |
| 15-(N-1) | ASN-1 | MAN-1 | 67% |
| 15-N | ASN | MAN | 76% |

MAGNETIC DISK DRIVE AND HEAD ADJUSTING METHOD

CROSS-REFERENCE TO RELATED APPLICATION(S)

This application is based upon and claims the benefit of priority from Japanese Patent Application No. 2020-026019, filed on Feb. 19, 2020, the entire contents of which are incorporated herein by reference.

FIELD

Embodiments described herein relate generally to a magnetic disk drive and a method of adjusting head characteristics.

BACKGROUND

In order to achieve a higher recording density and a higher recording capacity of a magnetic disk drive, various recording types such as a high-frequency, microwave assisted magnetic recording (MAMR) type or a thermally assisted magnetic recording (TAMR) type are being developed. The high-frequency assisted recording type is a technique which uses a magnetic head that includes a recording magnetic pole (a main magnetic pole) that is excited by an application of a recording current to generate a recording magnetic field, and a high-frequency oscillator, in which a high-frequency magnetic field generated by energizing the high-frequency oscillator is applied to a disk so as to reduce a coercive force of a portion of the disk to which the high-frequency magnetic field is applied. The thermally assisted magnetic recording type is a technique which uses a magnetic head having a light irradiation element that radiates irradiation light toward a disk, so that the disk is irradiated with the irradiation light from the tip of the light irradiation element and the disk is locally heated so as to reduce a coercive force of a heated portion of the disk.

DETAILED DESCRIPTION

Embodiments provide a magnetic disk drive and a method of adjusting head characteristics to enhance reliability of data recorded by the head.

In general, according to one embodiment, a magnetic disk drive includes: a first disk having a first surface; a second disk having a second surface; a first head including a first write head configured to write data on the first surface at a first recording density, and a first assist element configured to generate a first energy for increasing a write performance by the first write head, toward the first surface; a second head including a second write head configured to write data on the second surface at a second recording density, and a second assist element configured to generate a second energy for increasing a write performance by the second write head, toward the second surface; and a controller configured to change at least one of the first recording density and the second recording density according to a first recording capacity up to which the first head is capable of writing on the first disk, a second recording capacity up to which the second head is capable of writing on the second disk, and a target capacity.

Hereinafter, embodiments will be described with reference to drawings. Also, the drawings are merely examples, and do not limit the scope of the present disclosure.

First Embodiment

Figure 1:
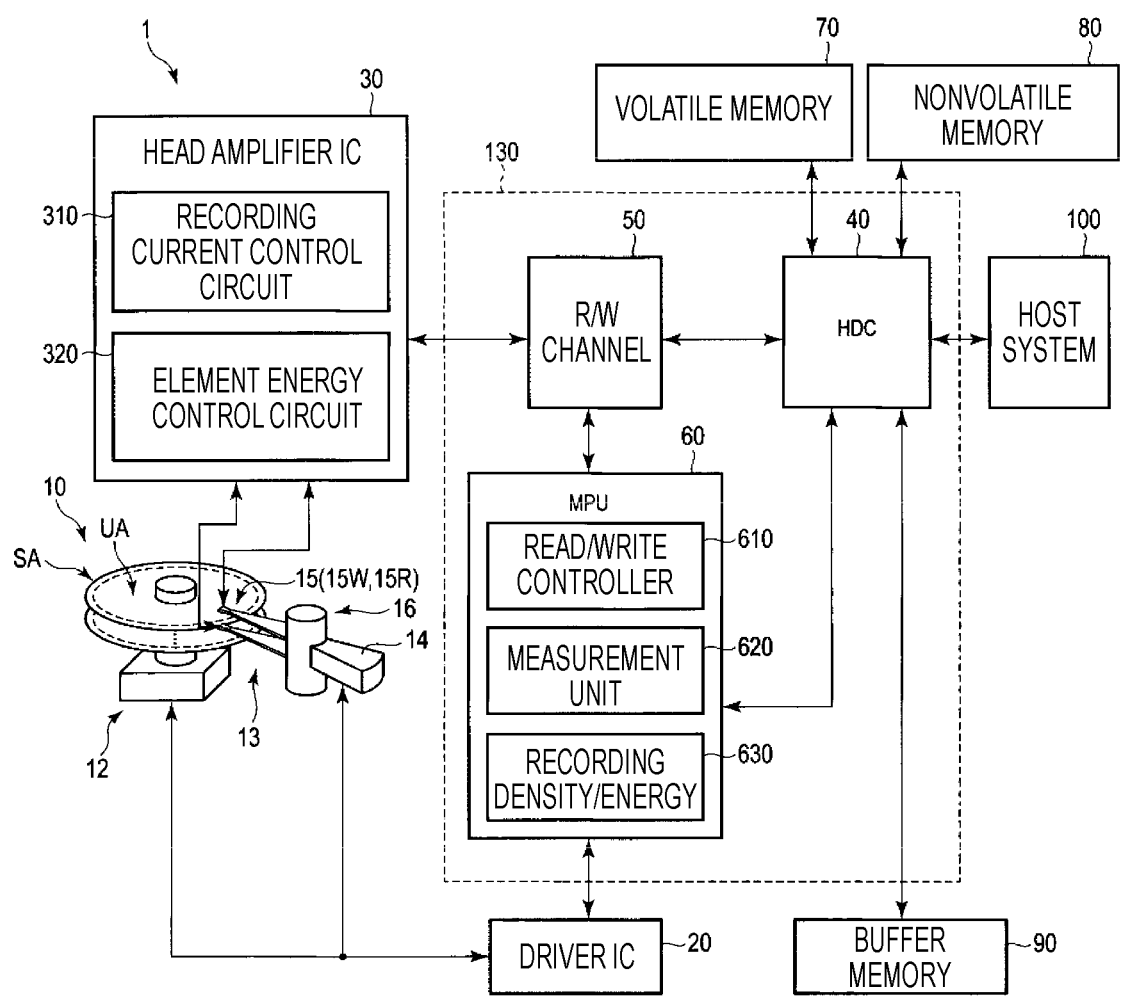
FIG. 1 is a block diagram illustrating the configuration of a magnetic disk drive according to a first embodiment.

FIG. 1 is a block diagram illustrating the configuration of a magnetic disk drive 1 according to a first embodiment.

The magnetic disk drive 1 includes a head disk assembly (HDA) to be described below, a driver IC 20, a head amplifier integrated circuit (hereinafter, a head amplifier IC or a preamplifier) 30, a volatile memory 70, a nonvolatile memory 80, a buffer memory (buffer) 90, and a system controller 130 as a single-chip integrated circuit. The magnetic disk drive 1 is connected to a host system (hereinafter, simply referred to as a host) 100.

The HDA includes a magnetic disk (hereinafter, referred to as a disk) 10, a spindle motor (hereinafter, referred to as an SPM) 12, an arm 13 on which a head 15 is mounted, and a voice coil motor (hereinafter, referred to as a VCM) 14. The disk 10 is attached to the SPM 12, and is rotated by driving the SPM 12. The disk 10 includes at least one disk 10. For example, the disk 10 includes a plurality of disks 10. The arm 13 and the VCM 14 constitute an actuator 16. The arm 13 includes at least one arm 13. For example, the arm 13 includes a plurality of arms 13. The head 15 includes at least one head 15. For example, the head 15 includes a plurality of heads 15. The actuator 16 controls the movement of the head 15 mounted on the arm 13 to a predetermined position of the disk 10 by driving of the VCM 14. Also, two or more actuators 16 may be provided.

In the disk 10, a user data area UA usable by a user, and a system area SA where information required for system management is written are allocated in an area where data is writable. The disk 10 includes a front-side recording surface (hereinafter, may be simply referred to as a front surface), and a back-side recording surface (hereinafter, may be referred to as a back surface) opposite to the front-side recording surface. In one embodiment, the user data area UA and the system area SA are allocated to the front surface and the back surface of the disk 10, respectively. Also, in addition to the user data area UA and the system area SA, a media cache area may be further allocated to the disk 10. Hereinafter, a direction from the inner circumference toward the outer circumference of the disk 10, or a direction from the outer circumference toward the inner circumference of the disk 10 is referred to as a radial direction. In the radial direction, a direction from the inner circumference toward the outer circumference is referred to as an outward direction (outwards), and a direction from the outer circumference toward the inner circumference is referred to as an inward direction (inwards). A direction orthogonal to the radial direction of the disk 10 is referred to as a circumferential direction. The circumferential direction corresponds to a direction along the circumference of the disk 10. In certain cases, a predetermined position in the radial direction of the disk may be referred to as a radial position, and a predetermined position in the circumferential direction of the disk 10 may be referred to as a circumferential position. In certain cases, the radial position and the circumferential position are collectively simply referred to as a position. The disk 10 (e.g., the user data area UA) is divided into a plurality of areas in a predetermined range in the radial direction. In certain cases, the areas on the disk 10 divided in the predetermined range in the radial direction may be referred to as zones. The zone includes a plurality of tracks. The track includes a plurality of sectors. Also, the term "track" is used herein to refer to one area among the plurality of areas on the disk 10 divided in the radial direction, a path of the head 15 at a predetermined radial position, data extending in the circumferential direction of the disk 10, one round of data written on a track at a predetermined radial position, data written on a track, or other various meanings used in the art. The term "sector" is used herein to refer to one area among a plurality of areas on the track divided in the circumferential direction, data written at a predetermined position of the disk 10, data written on a sector, or other various meanings used in the art. In certain cases, the phrase "a track written on the disk 10" may be referred to as a "write track," and "a track read from the disk 10" may be referred to as a "read track." In certain cases, the "write track" may be simply referred to as a "track," the "read track" may be simply referred to as a "track," and the "write track" and the "read track" may be collectively referred to as a "track." In certain cases, the phrase "the radial width of the track" may be referred to as a "track width." In certain cases, the phrase "the radial width of the write track" may be referred to as a "write track width", and "the radial width of the read track" may be referred to as a "read track width." In certain cases, the phrase "write track width and the read track width" may be collectively simply referred to as a "track width." The phrase "a path passing through the center position of the track width in a predetermined track" is referred to as a "track center." In certain cases, the phrase "a path passing through the center position of the write track width in a predetermined write track" may be referred to as a "write track center," and the phrase "a path passing through the center position of the read track width in a read track" may be referred to as a "read track center." In certain cases, the phrase "write track center and the read track center" may be collectively simply referred to as a "track center."

The head 15 faces the disk 10. For example, one head 15 faces one surface of the disk 10. The head 15 includes a slider as a main body, and a write head 15W and a read head 15R mounted in the corresponding slider. The write head 15W writes data on the disk 10. The read head 15R reads data written on the disk 10. Also, in certain cases the phrase "the write head 15W" may be simply referred to as "the head 15," the phrase "the read head 15R" may be simply referred to as "the head 15," and the phrase "the write head 15W and the read head 15R" may be collectively referred to as "the head 15." In certain cases, the phrase "the central portion of the head 15" may be referred to as "the head 15," the phrase "the central portion of the write head 15W" may be referred to as "the write head 15W," and the phrase "the central portion of the read head 15R" may be referred to as "the read head 15R." In certain cases, the phrase "the central portion of the write head 15W" may be simply referred to as "the head 15," and the phrase "the central portion of the read head 15R" may be simply referred to as "the head 15." In certain cases, the phrase "positioning the central portion of the head 15 at the track center of a predetermined track" may be expressed as "positioning the head 15 at a predetermined track," "disposing the head 15 at a predetermined track," or "locating the head 15 at a predetermined track."

Figure 2:
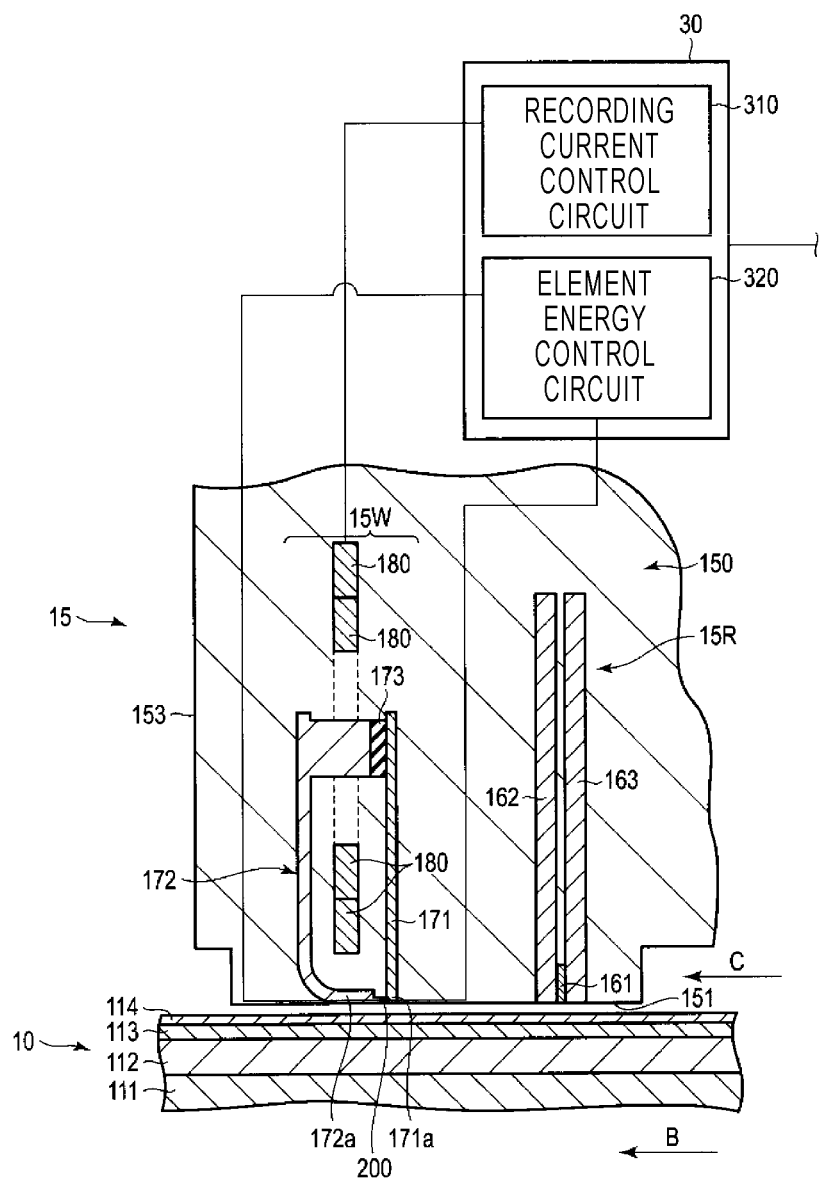
FIG. 2 is an enlarged sectional view illustrating a portion of a disk and a head according to the first embodiment.

FIG. 2 is an enlarged sectional view illustrating a portion of the disk 10 and the head 15 according to the present embodiment. In FIG. 2, a rotation direction B of the disk 10 is coincident with the direction of an air flow C. Hereinafter, a direction from the head 15 towards the disk 10 is referred to as a downward direction or simply "down," and a direction from the disk 10 towards the head 15 is referred to as an upward direction or simply "up." When there is an expression such as "another layer on a predetermined layer" or "another layer under a predetermined layer," another layer may be adjacent to the predetermined layer or may be located non-adjacent to the predetermined layer.

In the example illustrated in FIG. 2, in the disk 10, a substrate 111, a soft magnetic layer 112, a magnetic recording layer 113, and a protective film layer 114 are sequentially stacked. The substrate 111 is made of a disc-shaped non-magnetic material. The soft magnetic layer 112 is located on the substrate 111. The soft magnetic layer 112 is made of a material exhibiting soft magnetic characteristics. The magnetic recording layer 113 is located on the soft magnetic layer 112. The magnetic recording layer 113 has magnetic anisotropy in a direction perpendicular to the front surface of the disk 10 (corresponding to the front surface of the magnetic recording layer 113 or the front surface of the protective film layer 114). The protective film layer 114 is located on the magnetic recording layer 113.

In the example illustrated in FIG. 2, the head 15 includes a slider 150. The slider 150 is made of, for example, a sintered body of alumina and titanium carbide (AlTiC). The slider 150 includes a disk-facing surface (also referred to as an air bearing surface (ABS)) 151 facing the front surface of the disk 10, for example, the protective film layer 114, and a trailing end 153 located on the outflow side of the air flow C. Parts of the read head 15R and the write head 15W are exposed on the disk-facing surface 151.

The read head 15R includes a magnetic film 161, a shield film 162, and a shield film 163. The magnetic film 161 is located between the shield film 162 and the shield film 163, and causes a magnetoresistive effect. The shield film 162 is located closer to the trailing end 153 side than the magnetic film 161. The shield film 163 faces the shield film 162. Lower ends of the magnetic film 161, the shield film 162, and the shield film 163 are exposed on the disk-facing surface 151.

The write head 15W is provided closer to the trailing end 153 side of the slider 150 than the read head 15R. The write head 15W includes a main magnetic pole 171, a trailing shield (also referred to as a write shield) 172, an insulator 173, a recording coil 180, and a magnetic flux controller (also referred to as an assist element), for example, a spin torque oscillator (STO) 200. The recording coil 180 is wound around a magnetic circuit including the main magnetic pole 171 and the write shield 172 such that a magnetic flux flows through the main magnetic pole 171.

The main magnetic pole 171 is made of a soft magnetic material having a high saturation magnetic flux density. The main magnetic pole 171 generates a recording magnetic field in a direction perpendicular to the front surface of the disk 10 in order to magnetize the magnetic recording layer 113 of the disk 10. In the illustrated example, the main magnetic pole 171 extends substantially perpendicularly to the disk-facing surface 151. The lower surface of a tip portion 171a of the main magnetic pole 171 on the disk-facing surface 151 side is exposed on the disk-facing surface 151. The tip portion 171a of the main magnetic pole 171 is formed in a substantially columnar shape having a narrower width than other portions of the main magnetic pole 171 and is also narrowed down toward the disk-facing surface 151 (e.g., in a tapered shape). The cross track direction width of the tip portion 171a of the main magnetic pole 171 substantially corresponds to the track width of a write track. The cross track direction is, for example, a direction along the radial direction.

The write shield 172 is made of a soft magnetic material having a high saturation magnetic flux density. The write shield 172 efficiently closes the magnetic path via the soft magnetic layer 112 directly below the main magnetic pole 171. The write shield 172 is located closer to the trailing end 153 side than the main magnetic pole 171. The write shield 172 is connected to the main magnetic pole 171 via the insulator 173. The main magnetic pole 171 and the write shield 172 are electrically insulated, and form a magnetic circuit. The write shield 172 is formed substantially in an L-shape, and has a tip portion 172a facing the tip portion 171a of the main magnetic pole 171 with a write gap therebetween, on the disk-facing surface 151 side. The lower surface of the tip portion 172a is exposed on the disk-facing surface 151 of the slider 150.

The recording coil 180 is wound around the magnetic circuit including the main magnetic pole 171 and the write shield 172 such that a magnetic flux flows through the main magnetic pole 171. The recording coil 180 is provided between, for example, the main magnetic pole 171 and the write shield 172. When a predetermined magnitude of current (referred to as a write current or a recording current) is supplied to the recording coil 180, a recording magnetic field is excited in the main magnetic pole 171 and the write shield 172. Thus, the main magnetic pole 171 and the write shield 172 are magnetized. The magnetization direction of a recording bit in the magnetic recording layer 113 of the disk 10 is changed by a magnetic flux flowing through the magnetized main magnetic pole 171 and write shield 172 so that a magnetization pattern is recorded on the disk 10 according to the recording current.

The assist element, for example, the STO 200, is provided in a gap between the tip portion 171a of the main magnetic pole 171 and the tip portion 172a of the write shield 172 (hereinafter, may be referred to as a write gap). The STO 200 has a structure in which, for example, an underlayer formed of a non-magnetic conductive layer, a spin injection layer, an intermediate layer, an oscillation layer, and a gap layer formed of a non-magnetic conductive layer are sequentially stacked along a direction extending from the tip portion 171a side of the main magnetic pole 171 to the tip portion 172a side of the write shield 172.

When a predetermined magnitude (hereinafter, may be referred to as an element energy amount) of energy (hereinafter, may be referred to as an element energy or an assist energy) is applied, the assist element generates, on the disk 10, a predetermined magnitude (hereinafter, may be referred to as an assist amount) of energy that assists a write operation on the disk 10 by the write head 15W or increases a write performance, for example, a high-frequency magnetic field. For example, when a predetermined magnitude (hereinafter, may be referred to as a current value) of current (hereinafter, referred to as a drive current, a bias current, or an assist current) or a predetermined magnitude (hereinafter, may be referred to as a voltage value) of voltage (hereinafter, referred to as a drive voltage, a bias voltage, or an assist voltage) is applied, as the element energy, to the STO 200, due to a gap magnetic field generated within the write gap, magnetization uniformly rotates (spin precession), and a high-frequency magnetic field (microwaves) having a frequency sufficiently higher than the frequency of a recording signal is generated toward the disk 10. The STO 200 reduces a coercive force of the magnetic recording layer 113 by applying the high-frequency magnetic field to the magnetic recording layer 113 of the disk 10. When a large spin precession occurs in the STO 200, the magnetic permeability of the STO 200 is placed in as low a state as the magnetic permeability of air. Thus, the magnetic flux from the main magnetic pole 171 easily flows toward the disk 10 rather than the write gap (the STO 200). Meanwhile, when no spin precession occurs in the STO 200 or occurrence of spin precession is smaller than usual, the magnetic permeability of the STO 200 is placed in a state higher than the magnetic permeability of air. Thus, the magnetic flux from the main magnetic pole 171 easily flows toward the write gap (the STO 200) rather than the disk 10. Hereinafter, the phrase "a write operation of writing data on the disk 10 while generating, on the disk 10, an energy that assists the write operation by supplying an element energy to the assist element" or "a write operation of writing data on the disk 10 while generating, on the disk 10, an energy that increases a write performance by supplying an element energy to the assist element" is referred to as "assisted recording." For example, in certain cases, the phrase "assisted recording of writing data while generating a high-frequency magnetic field on the disk 10 by supplying an assist current or an assist voltage to the STO 200" may be referred to as "high-frequency assisted recording". In certain cases, the phrase "assisted recording" may be simply referred to as "writing." In certain cases, the effect of assisting a write operation on the disk 10 may be referred to as an assist effect. For example, an assist amount of an energy generated from the assist element changes according to an element energy amount supplied to the assist element. For example, when the element energy amount supplied to the assist element increases, the assist amount of the energy generated from the assist element also increases. For example, when the element energy amount supplied to the assist element decreases, the assist amount of the energy generated from the assist element also decreases. Alternatively, the assist amount of the energy generated from the assist element may not change according to the element energy amount supplied to the assist element.

Figure 3:
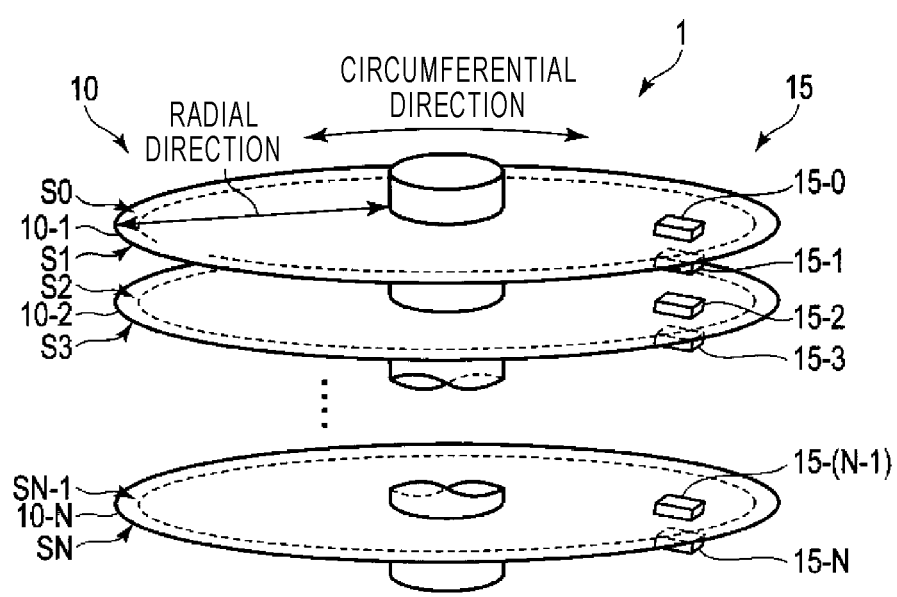
FIG. 3 is a schematic view illustrating an example arrangement of heads with respect to disks.

FIG. 3 is a schematic view illustrating an example of arrangement of the head 15 with respect to the disk 10 according to the present embodiment.

In FIG. 3, the disk 10 includes a disk 10-1, a disk 10-2, . . . , a disk 10-M, where M is any integer greater than 0. The disk 10-1 includes a front surface S0 and a back surface S1 opposite to the front surface S0. The disk 10-2 includes a front surface S2 and a back surface S3 opposite to the front surface S2. The disk 10-M includes a front surface SN-1 and a back surface SN opposite to the front surface SN-1, where N is 2*(M−1)+1.

In FIG. 3, the head 15 includes a head 15-0, a head 15-1, a head 15-2, a head 15-3, . . . , a head 15-(N−1), and a head 15-N. The head 15-0 faces the front surface S0. The head 15-0 writes data on the front surface S0, and reads data from the front surface S0. The head 15-1 faces the back surface S1. The head 15-1 writes data on the back surface S1, and reads data from the back surface S1. The head 15-2 faces the front surface S2. The head 15-2 writes data on the front surface S2, and reads data from the front surface S2. The head 15-3 faces the back surface S3. The head 15-3 writes data on the back surface S3, and reads data from the back surface S3. The head 15-(N−1) faces the front surface SN-1. The head 15-(N−1) writes data on the front surface SN-1, and reads data from the front surface SN-1. The head 15-N faces the back surface SN. The head 15-N writes data on the back surface SN, and reads data from the back surface SN. Hereinafter, in certain cases, the sum of the recording capacities of the disks 10 mounted in the magnetic disk drive 1 may be referred to as a total capacity. The total capacity corresponds to, for example, the sum of recording capacities to which the predetermined heads 15 are capable of writing on the disks 10, respectively. In the example illustrated in FIG. 3, the total capacity is the sum of a recording capacity of data writable by the head 15-0 on the front surface S0 of the disk 10-1, a recording capacity of data writable by the head 15-1 on the back surface S1 of the disk 10-1, a recording capacity of data writable by the head 15-2 on the front surface S2 of the disk 10-2, a recording capacity of data writable by the head 15-3 on the back surface S3 of the disk 10-2, . . . , a recording capacity of data writable by the head 15-(N−1) on the front surface SN-1 of the disk 10-N, and a recording capacity of data writable by the head 15-N on the back surface SN of the disk 10-N. In some embodiments, the total capacity may be the sum of recording capacities on recording surfaces of all disks 10 of the magnetic disk drive 1, may be the sum of recording capacities on recording surfaces of some of the disks 10 of the magnetic disk drive 1, or may be a recording capacity on a recording surface of one disk 10 of the magnetic disk drive 1.

The driver IC 20 controls driving of the SPM 12 and the VCM 14 according to the control of the system controller 130 (specifically, an MPU 60 to be described below).

The head amplifier IC (preamplifier) 30 includes a read amplifier and a write driver. The read amplifier amplifies a read signal read from the disk 10, and outputs the read signal to the system controller 130 (specifically, a read/write (R/W) channel 50 to be described below). The write driver includes, for example, a recording current control circuit 310 and an element energy control circuit. The recording current control circuit 310 is electrically connected to the recording coil 180 so as to supply a recording current corresponding to write data output from the R/W channel 50, to the recording coil 180. For example, the recording current control circuit 310 supplies a recording current to the recording coil 180 according to the control of the system controller 130 (the MPU 60). The element energy control circuit 320 is electrically connected to an assist element, for example, the STO 200, so as to apply a predetermined element energy, for example, a predetermined assist current or a predetermined assist voltage, to the STO 200 according to the control of the system controller 130, for example, the MPU 60.

The volatile memory 70 is a semiconductor memory where saved data is lost when power supply is cut off. The volatile memory 70 stores data required for processing in each unit of the magnetic disk drive 1. The volatile memory 70 is, for example, a dynamic random access memory (DRAM) or a synchronous dynamic random access memory (SDRAM).

The nonvolatile memory 80 is a semiconductor memory where saved data is still recorded even when power supply is cut off. The nonvolatile memory 80 is, for example, a NOR-type or NAND-type flash read only memory (flash ROM: FROM).

The buffer memory 90 is a semiconductor memory that temporarily records data transmitted/received between the magnetic disk drive 1 and the host 100. Also, the buffer memory 90 may be configured to be integrated with the volatile memory 70. The buffer memory 90 is, for example, a DRAM, a static random access memory (SRAM), an SDRAM, a ferroelectric random access memory (FeRAM), or a magnetoresistive random access memory (MRAM).

The system controller (controller) 130 is implemented using, for example, a large-scale integrated circuit (LSI) called a System-on-a-Chip (SoC) in which a plurality of circuit elements is integrated on a single chip. The system controller 130 includes a hard disk controller (HDC) 40, the read/write (R/W) channel 50, and the microprocessor (MPU) 60. The HDC 40, the R/W channel 50, and the MPU 60 are electrically connected to each other. The system controller 130 is electrically connected to, for example, the driver IC 20, the head amplifier IC 30, the volatile memory 70, the nonvolatile memory 80, the buffer memory 90, and the host system 100.

The HDC 40 controls data transmission between the host 100 and the R/W channel 50 according to an instruction from the MPU 60 to be described below. The HDC 40 is electrically connected to, for example, the volatile memory 70, the nonvolatile memory 80, and the buffer memory 90.

The R/W channel 50 executes a signal processing of read data and write data according to an instruction from the MPU 60. The R/W channel 50 is electrically connected to, for example, the head amplifier IC 30. The R/W channel 50 includes a circuit which modulates write data. The R/W channel 50 includes a circuit which measures a signal quality of read data.

The MPU 60 is a main controller that controls each unit of the magnetic disk drive 1. The MPU 60 controls the VCM 14 via the driver IC 20 to execute positioning of the head 15. The MPU 60 controls an operation of writing data on the disk 10 while selecting a storage destination of write data transmitted from the host 100. The MPU 60 controls an operation of reading data from the disk 10 while controlling processing of read data transmitted from the disk 10 to the host 100. The MPU 60 is connected to each unit of the magnetic disk drive 1. The MPU 60 is electrically connected to, for example, the driver IC 20, the HDC 40, and the R/W channel 50.

The MPU 60 includes a read/write controller 610, a measurement unit 620, and a recording density/energy controller 630. The MPU 60 executes processing of each unit, for example, the read/write controller 610, the measurement unit 620, or the recording density/energy controller 630 on firmware. Alternatively, the MPU 60 may implement each unit, for example, the read/write controller 610, the measurement unit 620, or the recording density/energy controller 630, as a circuit.

The read/write controller 610 controls an operation of writing data and an operation of reading data according to a command from the host 100. The read/write controller 610 controls the VCM 14 via the driver IC 20, and positions the head 15 to a target position of the disk 10 so as to execute the write operation or the read operation. To carry out assisted recording, the read/write controller 610 writes data on the disk 10 while generating, on the disk 10, an energy that assists a write operation, for example, a high-frequency magnetic field, by supplying an element energy, for example, an assist current or an assist voltage, to an assist element, for example, the STO 200. The read/write controller 610 may also write data on the disk 10 without an assist effect while not supplying an element energy, for example, an assist current or an assist voltage, to an assist element, for example, the STO 200.

The measurement unit 620 measures characteristics of each disk 10 and each head 15. The measurement unit 620 measures the life of an assist element of each head 15 (hereinafter, referred to as an element life in certain cases). The element life corresponds to, for example, the degree of wear of the assist element (or a wear level) or the degree of deterioration (or a deterioration level). For example, the element life is long, when the degree of wear of the assist element is small, while the element life is short, when the degree of wear of the assist element is large.

It is possible to measure the element life of each assist element that generates a predetermined assist amount of energy by supplying a predetermined element energy amount of element energy to each assist element of each head 15. The measurement unit 620 may acquire the relationship between the assist amount and the element life corresponding to each head 15, on the basis of the element life of each assist element which is measured by supplying the predetermined element energy amount of element energy to each assist element of each head 15 and causing each assist element to generate the predetermined assist amount of energy. The measurement unit 620 also may acquire the relationship between the assist amount and the element life, on the basis of tables of various data that is not directly measured, for example, various data obtained during mass production of magnetic disk drives.

The measurement unit 620 measures an assist amount of an energy generated from each assist element of each head 15. The measurement unit 620 measures the assist amount of the energy generated when an element energy is supplied to an assist element having a predetermined element energy determination value (where "element energy determination value" corresponds to "element resistance value" in certain cases). The measurement unit 620 acquires the relationship between the assist amount and the element energy determination value corresponding to each head 15, on the basis of the assist amount of the energy generated from the assist element, which is measured by the measurement unit 620. The measurement unit 620 also may acquire the relationship between the assist amount and the element energy determination value corresponding to each head 15, on the basis of tables of various data that is not directly measured, for example, various data obtained during mass production of magnetic disk drives. The measurement unit 620 may estimate the relationship between the assist amount and the element life corresponding to each head 15, on the basis of the relationship between the assist amount and the element energy determination value corresponding to each head 15.

The measurement unit 620 measures an error rate corresponding to each head 15. The measurement unit 620 measures the error rate in each area of each disk 10 on which data is written with assisted recording by each head 15 in which a predetermined element energy amount of element energy is supplied to each assist element. The measurement unit 620 thereby acquires the relationship between the element energy amount and the error rate corresponding to each head 15, on the basis of the error rate measured on each area of each disk 10 on which data is written by each head 15 in which the predetermined element energy amount of element energy is supplied to each assist element.

For example, the measurement unit 620 measures an error rate, for example, a bit error rate (BER) in each zone or each track of each disk 10 on which data is written by each head 15 in which an assist current having a predetermined assist current value or an assist voltage having a predetermined assist voltage value is applied to each STO 200. The measurement unit 620 thereby acquires the relationship between the element energy amount and the error rate corresponding to each head 15, on the basis of the error rate measured on each zone or each track of each disk 10 on which data is written by each head 15 in which the assist current having the predetermined assist current value or the assist voltage having the predetermined assist voltage value is applied to each STO 200. For example, the measurement unit 620 measures an error rate, for example, a BER, in several zones or several tracks of each disk 10 on which data is written by each head 15 in which an assist current having a predetermined assist current value or an assist voltage having a predetermined assist voltage value is applied to each STO 200.

Accordingly, the measurement unit 620 acquires the relationship between the element energy amount and the error rate corresponding to each head 15, on the basis of the error rate measured on several zones or several tracks of each disk 10 on which data is written by each head 15 in which the assist current having the predetermined assist current value or the assist voltage having the predetermined assist voltage value is applied to each STO 200. The measurement unit 620 also may acquire the relationship between the element energy amount and the error rate, on the basis of tables of various data that is not directly measured, for example, various data obtained during mass production of magnetic disk drives. Also, the measurement unit 620 may measure an error rate in each area of each disk 10 on which data is written with assisted recording by each head 15 that generates a predetermined assist amount of energy toward the disk 10 when a predetermined element energy amount of element energy is supplied to each assist element. The measurement unit 620 may thereby acquire the relationship between the assist amount and the error rate corresponding to each head 15, on the basis of the error rate measured on each area of each disk 10 on which data is written by each head 15 that generates the predetermined assist amount of energy on the disk 10 when the predetermined element energy amount of element energy is supplied to each assist element. The measurement unit 620 also may acquire the relationship between the assist amount and the error rate on the basis of tables of various data that is not directly measured, for example, various data obtained during mass production of magnetic disk drives.

The measurement unit 620 measures an error rate in each area of each disk 10 on which data is written with assisted recording at a predetermined recording density by each head 15 in which a predetermined element energy amount of element energy is supplied to each assist element. The measurement unit 620 thereby acquires the relationship between the element energy amount and the recording density corresponding to each head 15, on the basis of the error rate measured on each area of each disk 10 on which data is written at the predetermined recording density by each head in which the predetermined element energy amount of element energy is supplied to each assist element. For example, the measurement unit 620 measures an error rate, for example, a BER in each zone or each track of each disk 10 on which data is written at a predetermined recording density, for example, a predetermined linear recording density (BPI: bit per inch) or a predetermined track density (TPI: track per inch) by each head 15 in which an assist current having a predetermined assist current value or an assist voltage having a predetermined assist voltage value is applied to each STO 200. The phrase "recording density" includes at least one of "BPI" and "TPI." The measurement unit 620 may acquire the relationship between the element energy amount and the recording density, on the basis of tables of various data that is not directly measured, for example, various data obtained during mass production of magnetic disk drives.

The measurement unit 620 acquires the relationship between the recording density and the error rate corresponding to each head 15, on the basis of the error rate measured on each zone or each track of each disk 10 on which data is written at the predetermined recording density by each head 15 in which the assist current having the predetermined assist current value or the assist voltage having the predetermined assist voltage value is applied to each STO 200. For example, the measurement unit 620 may measure an error rate, for example, a BER, in several zones or several tracks of each disk 10 on which data is written at a predetermined recording density, for example, a predetermined BPI or a predetermined TPI, by each head 15 in which an assist current having a predetermined assist current value or an assist voltage having a predetermined assist voltage value is applied to each STO 200. The measurement unit 620 may thereby acquire the relationship between the recording density and the error rate corresponding to each head 15 on the basis of the error rate measured on several zones or several tracks of each disk 10 on which data is written at the predetermined recording density by each head 15 in which the assist current having the predetermined assist current value or the assist voltage having the predetermined assist voltage value is applied to each STO 200. The measurement unit 620 also may acquire the relationship between the recording density and the error rate, on the basis of tables of various data that is not directly measured, for example, various data obtained during mass production of magnetic disk drives.

The measurement unit 620 may record the measured characteristics of each head 15 and each disk 10, for example, the relationship between the element energy amount and the element life, the relationship between the element energy amount and the element energy determination value, the relationship between the element energy amount and the error rate, the relationship between the recording density and the error rate, the relationship between the assist amount and the element life, the relationship between the assist amount and the element energy determination value, and the relationship between the assist amount and the error rate in a predetermined recording area, for example, a predetermined area of each disk 10, the system area SA of each disk 10, or the nonvolatile memory 80.

In some embodiments, the measurement unit 620 may not be provided in the MPU 60. The characteristics of each head 15 and each disk 10, for example, the relationship between the element energy amount and the element life, the relationship between the element energy amount and the element energy determination value, the relationship between the element energy amount and the error rate, the relationship between the recording density and the error rate, the relationship between the assist amount and the element life, the relationship between the assist amount and the element energy determination value, and the relationship between the assist amount and the error rate may be measured by a device other than the magnetic disk drive 1, may be recorded in a predetermined recording area, for example, a predetermined area of each disk 10, the system area SA of each disk 10, or the nonvolatile memory 80.

The recording density/energy controller 630 adjusts (sets or controls) the recording density corresponding to each head 15, and the element energy amount of an element energy to be supplied to an assist element of each head 15. For example, the recording density/energy controller 630 adjusts (sets or controls) at least one of a BPI and a TPI (track per inch) corresponding to each head 15, and an assist current value or an assist voltage value of an assist current or an assist voltage to be supplied to the STO 200 of each head 15. The recording density/energy controller 630 adjusts (sets or controls) the recording density and the element energy amount of the element energy, for each head 15. For example, the recording density/energy controller 630 adjusts (sets or controls) at least one of the BPI and the TPI, and the assist current value of the assist current or the assist voltage value of the assist voltage, for each head 15 during variable adjustment of the capacity of the disk 10 in the manufacturing process.

The recording density/energy controller 630 adjusts (or sets) the recording density of each head 15, to a recording density set as an initial value (hereinafter, may be referred to as an initial recording density), and adjusts (or sets) the element energy amount to be supplied to each assist element of each head 15, to an element energy amount set as an initial value (hereinafter, may be referred to as an initial energy amount), during the manufacturing process. For example, during variable adjustment of the capacity of the disk 10 in the manufacturing process, the recording density/energy controller 630 adjusts (or sets) the BPI corresponding to each head 15, to a BPI set as an initial value (hereinafter, may be referred to as an initial BPI), adjusts (or sets) the TPI corresponding to each head 15, to a TPI set as an initial value (hereinafter, referred to as an initial TPI in certain cases), and adjusts (or sets) the assist current to be applied to each STO 200 of each head 15, to an assist current value set as an initial value (hereinafter, may be referred to as an initial assist current value). For example, during variable adjustment of the capacity of the disk 10 in the manufacturing process, the recording density/energy controller 630 adjusts (or sets) the BPI corresponding to each head 15, to the initial BPI, adjusts (or sets) the TPI corresponding to each head 15, to the initial TPI, and adjusts (or sets) the assist voltage to be applied to each STO 200 of each head 15, to an assist voltage value set as an initial value (hereinafter, may be referred to as an initial assist voltage value). Also, during variable adjustment of the capacity of the disk in the manufacturing process, the recording density/energy controller 630 may adjust the BPI corresponding to each head 15 to the initial BPI, and may adjust the assist current value (or the assist voltage value) of the assist current (or the assist voltage) to be applied to each STO 200 of each head 15, to the initial assist current value (or the initial assist voltage value). During variable adjustment of the capacity of the disk 10 in the manufacturing process, the recording density/energy controller 630 may adjust the TPI corresponding to each head 15 to the initial TPI, and may adjust the assist current value (or the assist voltage value) of the assist current (or the assist voltage) to be applied to each STO 200 of each head 15, to the initial assist current value (or the initial assist voltage value).

The recording density/energy controller 630 may record set values of recording densities (e.g., a BPI and a TPI)

corresponding to each head 15, as a table, in a predetermined recording area, for example, the system area SA of the disk 10 or the nonvolatile memory 80. For example, the recording density/energy controller 630 controls the recording density corresponding to each head 15, with reference to the set value of the recording density which corresponds to each head 15 and is recorded in the table. The recording density/energy controller 630 changes (sets or adjusts) the recording density corresponding to each head 15 by changing the set value of the recording density which corresponds to each head 15 and is recorded in the table.

The recording density/energy controller 630 may record a set value of a recording capacity of each disk 10, as a table, in a predetermined recording area, for example, the system area SA of the disk 10 or the nonvolatile memory 80. For example, the recording density/energy controller 630 may change (set or adjust) the recording capacity of each disk 10 by changing the set value of the recording capacity of each disk 10 which corresponds to each head 15 and is recorded in the table, according to a change of the set value of a recording density corresponding to each head 15. For example, the recording density/energy controller 630 may change (set or adjust) the recording density corresponding to each head 15, and change (set or adjust) the recording capacity of each disk 10 by changing the set value of the recording capacity of each disk 10 which is recorded in the table.

The recording density/energy controller 630 may record the set value of an assist amount of an energy to be generated from each assist element (e.g., the STO 200) of each head 15, as a table, in a predetermined recording area, for example, the system area SA of the disk 10 or the nonvolatile memory 80. For example, the recording density/energy controller 630 controls the assist amount of the energy to be generated from each assist element of each head 15 with reference to the set value of the assist amount of the energy to be generated from each assist element of each head 15 which is recorded in the table. The recording density/energy controller 630 changes (sets or adjusts) the assist amount of the energy to be generated from each assist element of each head 15 by changing the set value of the assist amount of the energy to be generated from each assist element of each head 15 which is recorded in the table. Also, the recording density/energy controller 630 may change (set or adjust) an element energy amount of an element energy to be supplied to each assist element of each head 15 and change (set or adjust) the assist amount of the energy to be generated from each assist element of each disk 10, by changing the set value of the assist amount of the energy to be generated from each assist element of each head 15 which is recorded in the table.

The recording density/energy controller 630 may record the set value of an element energy amount of an element energy to be supplied to each assist element of each head 15, as a table, in a predetermined recording area, for example, the system area SA of the disk 10 or the nonvolatile memory 80. For example, the recording density/energy controller 630 controls the element energy amount of the element energy to be supplied to each assist element of each head 15 with reference to the set value of the element energy amount of each assist element of each head 15 which is recorded in the table. The recording density/energy controller 630 changes (sets or adjusts) the element energy amount of the element energy to be supplied to each assist element of each head 15 by changing the set value of the element energy amount of the element energy of each assist element of each head 15 which is recorded in the table. Also, the recording density/energy controller 630 may change (set or adjust) the element energy amount of the element energy of each assist element of each head 15 by changing (setting or adjusting) the set value of the element energy amount of each assist element of each head 15 which is recorded in the table according to a change of the set value of an assist amount of each assist element of each head 15.

The recording density/energy controller 630 detects the capacity of the disk 10, for example, the total capacity. For example, after adjusting the recording density corresponding to each head 15, the recording density/energy controller 630 determines whether the total capacity matches a total capacity as a target (hereinafter, may be referred to as a target total capacity). Terms such as "identical," "same," "match," and "equivalent" include not only a meaning indicating that things are exactly the same, but also a meaning indicating that things are different to such an extent that they may be considered substantially the same.

When it is determined that the total capacity does not match the target total capacity, the recording density/energy controller 630 selects a head (hereinafter, may be referred to as a target head) 15 from the plurality of heads 15, adjusts (or changes) a recording density when data is written on the disk 10 corresponding to the target head 15 by the target head 15, and adjusts (or changes) an element energy amount of an element energy to be supplied to the assist element of the target head 15. That is, when it is determined that the total capacity does not match the target total capacity, the recording density/energy controller 630 selects the target head 15, adjusts (or changes) the recording density corresponding to the target head 15, adjusts (or changes) the element energy amount of the element energy to be supplied to the assist element of the target head 15, and adjusts a recording capacity of the disk 10 corresponding to the target head 15. In some embodiments, the recording density/energy controller 630 may be configured to adjust (or change) at least one of the recording density corresponding to the target head 15 and the element energy amount to be supplied to the assist element of the target head 15 when it is determined that the total capacity does not match the target total capacity. For example, when it is determined that the total capacity does not match the target total capacity, the recording density/energy controller 630 may adjust (or change) only the recording density corresponding to the target head 15.

For example, the recording density/energy controller 630 may select a target head 15 with a higher priority when changing the recording density (hereinafter, simply referred to as a priority in certain cases), from the plurality of heads 15 on the basis of the relationship between the element energy amount and the element life. For example, the recording density/energy controller 630 may calculate a change amount of each element life of each assist element of each head 15, which corresponds to a change amount of an element energy amount (e.g., an assist current value or an assist voltage value) of an element energy (e.g., an assist current or an assist voltage) to be supplied to each assist element (e.g., the STO 200) of each head 15, on the basis of the relationship between the element energy amount and the element life, and select the target head 15 with the higher priority on the basis of the change amount of the element life corresponding to the change amount of the element energy amount of the element energy to be supplied to each assist element of each head 15. For example, the recording density/energy controller 630 may select the target head 15 with the higher priority on the basis of the ratio of the element energy amount of the element energy to be supplied to each assist element of each head 15 (hereinafter, may be referred to as an energy amount ratio) with respect to the upper limit value of the element energy amount that may be supplied to each assist element of each head 15 (hereinafter, may be referred to as an upper limit energy amount). The upper limit energy amount corresponds to a maximum element energy amount by which a predetermined element life may be guaranteed when supplied to a predetermined assist element of a predetermined head 15. That is, the upper limit energy amount corresponds to the upper limit value of an element energy amount that may be supplied to the predetermined assist element of the predetermined head 15.

For example, on the basis of the relationship between the recording density and the element energy amount, the recording density/energy controller 630 adjusts the recording density (e.g., a BPI) corresponding to the target head 15, and adjusts the element energy amount (e.g., the assist current value or the assist voltage value) of the element energy (e.g., the assist current or the assist voltage) to be supplied to the assist element (e.g., the STO 200) of the target head 15 such that a change amount of an error rate (e.g., a BER) corresponding to a change amount of the recording density matches a change amount of an error rate corresponding to a change amount of the element energy amount. The recording density/energy controller 630 acquires the relationship between the recording density and the element energy amount corresponding to each head 15 on the basis of characteristics of each head 15 and each disk 10, for example, the relationship between the element energy amount and the element life, the relationship between the element energy amount and the element energy determination value, the relationship between the element energy amount and the error rate, and the relationship between the recording density and the error rate.

The recording density/energy controller 630 repeats a process of selecting the target head 15 from the plurality of heads 15, adjusting the recording density corresponding to the target head 15, and adjusting the element energy amount of the element energy to be supplied to the assist element of the target head 15 until the total capacity matches the target total capacity. For example, the recording density/energy controller 630 repeats a process of selecting the target head 15 in descending order of priority from the plurality of heads 15, adjusting the recording density corresponding to the target head 15, and adjusting the element energy amount of the element energy to be supplied to the assist element of the target head 15 until the total capacity matches the target total capacity.

For example, after adjusting the recording density (e.g., the BPI or the TPI) corresponding to each head 15, the recording density/energy controller 630 determines whether the total capacity is larger than the target total capacity. Also, after adjusting the recording density (e.g., the BPI or the TPI) corresponding to each head 15, the recording density/energy controller 630 determines whether the total capacity is larger or smaller than the target total capacity. When it is determined that the total capacity does not match the target total capacity, the recording density/energy controller 630 determines whether the total capacity is larger than the target total capacity.

For example, when it is determined that the total capacity is larger than the target total capacity, the recording density/energy controller 630 calculates a change amount of an element life of each of assist elements, which corresponds to a change amount of an element energy amount (e.g., an assist current value or an assist voltage value) of an element energy (e.g., an assist current or an assist voltage) to be supplied to each of the assist elements (e.g., the STOs 200) of the plurality of heads 15 on the basis of the relationship between the element energy amount and the element life. On the basis of the calculated change amount of the element life of each of the heads 15, the recording density/energy controller 630 selects a head 15 in which the change amount of the element life is largest when the element energy with a predetermined element energy amount of change amount is reduced, that is, a head 15 in which the element life is most improved when the element energy with a predetermined element energy amount of change amount is reduced, as a target head 15, from the plurality of heads 15. For example, on the basis of energy amount ratios corresponding to the heads 15, respectively, the recording density/energy controller 630 may select a head 15 corresponding to the largest energy amount ratio among the energy amount ratios, that is, a head 15 to which an element energy of an element energy amount closest to an upper limit energy amount is supplied, as a target head 15, from the plurality of heads 15.

When determining that the total capacity is larger than the target total capacity, the recording density/energy controller 630 reduces the recording density (e.g., a BPI) corresponding to the target head 15, and reduces the element energy amount of the element energy to be supplied to the assist element of the target head 15. That is, when determining that the total capacity is larger than the target total capacity, the recording density/energy controller 630 reduces the recording density (e.g., the BPI) corresponding to the target head 15, reduces the element energy amount of the element energy to be supplied to the assist element of the target head 15, and reduces the recording capacity of the disk 10 corresponding to the target head 15. Also, when determining that the total capacity is larger than the target total capacity, the recording density/energy controller 630 may reduce the recording density (e.g., the BPI) corresponding to the target head 15, and reduce the element energy amount of the element energy to be supplied to the assist element of the target head 15 according to a change amount of the recording density corresponding to the target head 15. When determining that the total capacity is larger than the target total capacity, the recording density/energy controller 630 may reduce the element energy amount of the element energy to be supplied to the assist element of the target head 15, and reduce the recording density (e.g., the BPI) corresponding to the target head 15 according to a change amount of the element energy amount corresponding to the target head 15. For example, when determining that the total capacity is larger than the target total capacity, the recording density/energy controller 630, on the basis of the relationship between the recording density and the element energy amount, reduces the recording density corresponding to the target head 15, and reduces the element energy amount of the element energy to be supplied to the assist element of the target head 15 such that a change amount of an error rate corresponding to a change amount of the recording density may match a change amount of an error rate corresponding to a change amount of the element energy amount. The recording density/energy controller 630 repeats a process of selecting the target head 15 from the plurality of heads 15, reducing the recording density corresponding to the target head 15, and reducing the element energy amount of the element energy to be supplied to the assist element of the target head 15 until the total capacity matches the target total capacity.

For example, when determining that the total capacity is not larger than the target total capacity, the recording density/energy controller 630 determines whether the total capacity is smaller than the target total capacity. When it is determined that the total capacity is smaller than the target total capacity, the recording density/energy controller 630 calculates a change amount of an element life of each of the heads 15, which corresponds to a change amount of an element energy amount (e.g., an assist current value or an assist voltage value) of an element energy (e.g., an assist current or an assist voltage) to be supplied to each of assist elements (e.g., the STOs 200) of the heads 15, on the basis of the relationship between the element energy amount and the element life. On the basis of the calculated change amount of the element life of each of the heads 15, the recording density/energy controller 630 selects a head 15 in which the change amount of the element life is smallest when the element energy with a predetermined element energy amount of change amount is increased, that is, a head 15 in which the element life is most unchanged when the element energy with a predetermined element energy amount of change amount is increased, as a target head 15.

For example, when determining that the total capacity is smaller than the target total capacity, the recording density/energy controller 630 increases the recording density corresponding to the target head 15, and increases the element energy amount of the element energy to be supplied to the assist element of the target head 15. That is, when determining that the total capacity is smaller than the target total capacity, the recording density/energy controller 630 increases the recording density corresponding to the target head 15, increases the element energy amount of the element energy to be supplied to the assist element of the target head 15, and increases the recording capacity of the disk 10 corresponding to the target head 15. Also, when determining that the total capacity is smaller than the target total capacity, the recording density/energy controller 630 may increase only the recording density corresponding to the target head 15. That is, when determining that the total capacity is smaller than the target total capacity, the recording density/energy controller 630 may not increase the element energy amount to be supplied to each assist element of each head 15. When determining that the total capacity is smaller than the target total capacity, the recording density/energy controller 630 may increase the recording density corresponding to the target head 15, and increase the element energy amount of the element energy to be supplied to the assist element of the target head 15 according to a change amount of the recording density corresponding to the target head 15. When determining that the total capacity is smaller than the target total capacity, the recording density/energy controller 630 may increase the element energy amount of the element energy to be supplied to the assist element of the target head 15, and increase the recording density corresponding to the target head 15 according to a change amount of the element energy amount corresponding to the target head 15. For example, on the basis of the relationship between the recording density and the element energy amount, the recording density/energy controller 630 increases the recording density corresponding to the target head 15, and increases the element energy amount to be supplied to the assist element of the target head 15 such that a change amount of an error rate corresponding to a change amount of the recording density may match a change amount of an error rate corresponding to a change amount of the element energy amount. The recording density/energy controller 630 repeats a process of selecting the target head 15 from the plurality of heads 15, increasing the recording density corresponding to the target head 15, and increasing the element energy amount to be supplied to the assist element of the target head 15 until the total capacity matches the target total capacity.

When determining that the total capacity does not match the target total capacity, the recording density/energy controller 630 may select a target head 15 from the plurality of heads 15, adjust (or change) the recording density corresponding to the target head 15, adjust (or change) the assist amount of an energy (e.g., a high-frequency magnetic field) to be generated from the assist element (e.g., the STO 200) of the target head 15, and adjust (or change) the element energy amount of the element energy to be supplied to the assist element of the target head 15. That is, when determining that the total capacity does not match the target total capacity, the recording density/energy controller 630 may select a target head 15 from the plurality of heads 15, adjust the recording density corresponding to the target head 15, adjust the assist amount of an energy to be generated from the assist element of the target head 15, adjust the element energy amount of the element energy to be supplied to the assist element of the target head 15, and adjust the recording capacity of the disk 10 corresponding to the target head 15. Also, the recording density/energy controller 630 may be configured to adjust (or change) at least one of the assist amount of an energy to be generated from the assist element of the target head 15, and the recording density at which data is written by the target head 15, when it is determined that the total capacity does not match the target total capacity. For example, when determining that the total capacity does not match the target total capacity, the recording density/energy controller 630 may adjust (or change) only the recording density corresponding to the target head 15.

For example, the recording density/energy controller 630 may select a target head 15 with a higher priority from the plurality of heads 15 on the basis of the relationship between the assist amount and the element life. For example, the recording density/energy controller 630 may calculate a change amount of each element life of each assist element of each head 15, which corresponds to a change amount of an assist amount of an energy to be generated from each assist element (e.g., the STO 200) of each head 15 on the basis of the relationship between the assist amount and the element life, and select the target head with the higher priority on the basis of the change amount of the element life corresponding to the assist amount of the energy to be generated from each assist element of each head 15. For example, the recording density/energy controller 630 may select the target head 15 with the higher priority on the basis of the ratio of the assist amount of the energy to be generated from each assist element of each head 15 (hereinafter, may be referred to as an assist amount ratio) with respect to the upper limit value of the assist amount to be generated from each assist element of each head 15 (hereinafter, may be referred to as an upper limit assist amount). The upper limit assist amount corresponds to a maximum assist amount by which a predetermined element life may be guaranteed when the assist amount is generated from a predetermined head 15. That is, the upper limit assist amount corresponds to the upper limit value of an assist amount that may be supplied to the predetermined assist element of the predetermined head 15.

For example, on the basis of the relationship between the recording density and the assist amount, the recording density/energy controller 630 adjusts the recording density (e.g., a BPI) corresponding to the target head 15, and adjusts the assist amount of the energy (e.g., the high-frequency magnetic field) to be generated from the assist element (e.g., the STO 200) of the target head 15 such that a change amount of an error rate (e.g., a BER) corresponding to a change amount of the recording density may match a change amount of an error rate corresponding to a change amount of the assist amount. The recording density/energy controller 630 acquires the relationship between the recording density and the assist amount corresponding to each head 15, on the basis of characteristics of each head 15 and each disk 10, for example, the relationship between the assist amount and the element life, the relationship between the assist amount and the element energy determination value, the relationship between the assist amount and the error rate, and the relationship between the recording density and the error rate.

The recording density/energy controller 630 repeats a process of selecting the target head 15 from the plurality of heads 15, adjusting the recording density corresponding to the target head 15, adjusting the assist amount of the energy to be generated from the assist element of the target head 15, and adjusting the element energy amount of the element energy to be supplied to the assist element of the target head 15 until the total capacity matches the target total capacity. For example, the recording density/energy controller 630 repeats a process of selecting the target head 15 in descending order of priority from the plurality of heads 15, adjusting the recording density corresponding to the target head 15, adjusting the assist amount of the energy to be generated from the assist element of the target head 15, and adjusting the element energy amount of the element energy to be supplied to the assist element of the target head 15 until the total capacity matches the target total capacity.

For example, after adjusting the recording density (the BPI or the TPI) corresponding to each head 15, the recording density/energy controller 630 determines whether the total capacity is larger than the target total capacity.

For example, when determining that the total capacity is larger than the target total capacity, the recording density/energy controller 630 may calculate a change amount of an element life of each of assist elements, which corresponds to a change amount of an assist amount of an energy (e.g., a high-frequency magnetic field) to be generated from each of the assist elements (e.g., the STOs 200) of the plurality of heads 15 on the basis of the relationship between the assist amount and the element life. On the basis of the calculated change amount of the element life of each of the heads 15, the recording density/energy controller 630 selects a head 15 in which the change amount of the element life is largest when the energy with a predetermined assist amount of change amount is reduced, that is, a head 15 in which the element life is most improved when the energy with a predetermined assist amount of change amount is reduced, as a target head 15, from the plurality of heads 15. For example, on the basis of assist amount ratios corresponding to the heads 15, respectively, the recording density/energy controller 630 may select a head 15 corresponding to the largest assist amount ratio among the assist amount ratios, that is, a head 15 from which an energy of an assist amount closest to an upper limit assist amount is generated, as a target head 15, from the plurality of heads 15.

When determining that the total capacity is larger than the target total capacity, the recording density/energy controller 630 reduces the recording density (e.g., a BPI) corresponding to the target head 15, and reduces the assist amount of the energy to be generated from the assist element of the target head 15. That is, when determining that the total capacity is larger than the target total capacity, the recording density/energy controller 630 may reduce the recording density corresponding to the target head 15, reduce the assist amount of the energy to be generated from the assist element of the target head 15, and reduce the recording capacity of the disk 10 corresponding to the target head 15. Also, when determining that the total capacity is larger than the target total capacity, the recording density/energy controller 630 may reduce the recording density (e.g., the BPI) corresponding to the target head 15, and reduce the assist amount of the energy to be generated from the assist element of the target head 15 according to a change amount of the recording density corresponding to the target head 15. Also, when determining that the total capacity is larger than the target total capacity, the recording density/energy controller 630 may reduce the recording density (e.g., the BPI) corresponding to the target head 15, and reduce the assist amount of the energy to be generated from the assist element of the target head 15 according to a change amount of the recording density corresponding to the target head 15. When determining that the total capacity is larger than the target total capacity, the recording density/energy controller 630 may reduce the assist amount of the energy to be generated from the assist element of the target head 15, and reduce the recording density (e.g., the BPI) according to a change amount of the assist amount corresponding to the target head 15. For example, on the basis of the relationship between the recording density and the assist amount, the recording density/energy controller 630 reduces the recording density corresponding to the target head 15, and reduces the assist amount of the energy to be generated from the assist element of the target head 15 such that a change amount of an error rate corresponding to a change amount of the recording density may match a change amount of an error rate corresponding to a change amount of the assist amount. The recording density/energy controller 630 repeats a process of selecting the target head 15 from the plurality of heads 15, reducing the recording density corresponding to the target head 15, and reducing the assist amount of the energy to be generated from the assist element of the target head 15 until the total capacity matches the target total capacity.

For example, when determining that the total capacity is not larger than the target total capacity, the recording density/energy controller 630 determines whether the total capacity is smaller than the target total capacity. When determining that the total capacity is smaller than the target total capacity, the recording density/energy controller 630 may calculate a change amount of an element life of each of the heads 15, which corresponds to a change amount of an assist amount of an energy to be generated from each of assist elements (e.g., the STOs 200) of the heads 15, on the basis of the relationship between the assist amount and the element life. On the basis of the calculated change amount of the element life of each of the heads 15, the recording density/energy controller 630 selects a head 15 in which the change amount of the element life is smallest when the energy with a predetermined assist amount of change amount is increased, that is, a head 15 in which the element life is most unchanged when the energy with a predetermined assist amount of change amount is increased, as a target head 15.

For example, when determining that the total capacity is smaller than the target total capacity, the recording density/energy controller 630 increases the recording density corresponding to the target head 15, and increases the assist amount of the energy to be generated from the assist element of the target head 15. That is, when determining that the total capacity is smaller than the target total capacity, the recording density/energy controller 630 may increase the recording density corresponding to the target head 15, increase the assist amount of the energy to be generated from the assist element of the target head 15, and increase the recording capacity of the disk 10 corresponding to the target head 15. Also, when determining that the total capacity is smaller than the target total capacity, the recording density/energy controller 630 may increase only the recording density corresponding to the target head 15. That is, when determining that the total capacity is smaller than the target total capacity, the recording density/energy controller 630 may not increase the assist amount of the energy to be generated from each assist element of each head 15. When determining that the total capacity is smaller than the target total capacity, the recording density/energy controller 630 may increase the recording density corresponding to the target head 15, and increase the assist amount of the energy to be generated from the assist element of the target head 15 according to a change amount of the recording density corresponding to the target head 15. When determining that the total capacity is smaller than the target total capacity, the recording density/energy controller 630 may increase the assist amount of the energy to be generated from the assist element of the target head 15, and increase the recording density corresponding to the target head 15 according to a change amount of the assist amount corresponding to the target head 15. For example, on the basis of the relationship between the recording density and the assist amount, the recording density/energy controller 630 increases the recording density corresponding to the target head 15, and increases the assist amount of the energy to be generated from the assist element of the target head 15 such that a change amount of an error rate corresponding to a change amount of the recording density may match a change amount of an error rate corresponding to a change amount of the assist amount. The recording density/energy controller 630 repeats a process of selecting the target head 15 from the plurality of heads 15, increasing the recording density corresponding to the target head 15, and increasing the assist amount of the energy to be generated from the assist element of the target head 15 until the total capacity matches the target total capacity.

Figure 4:
FIG. 4 is an example of a recording density table.

FIG. 4 is a view illustrating an example of a table TB1 of the recording density of each head 15. In FIG. 4, the table TB1 includes heads 15-0, 15-1, 15-2, 15-3, . . . , 15-(N−1), and 15-N, and recording densities RD0, RD1, RD2, RD3, . . . , RDN-1, and RDN corresponding to the heads 15-0, 15-1, 15-2, 15-3, . . . , 15-(N−1), and 15-N, respectively. For example, the heads 15-0, 15-1, 15-2, 15-3, . . . , 15-(N−1), and 15-N illustrated in the table TB1 correspond to the heads 15-0, 15-1, 15-2, 15-3, . . . , 15-(N−1), and 15-N illustrated in FIG. 3, respectively. In the table TB1, the recording density corresponds to, for example, a BPI. Alternatively, in the table TB1, the recording density may correspond to, for example, a TPI or may correspond to the BPI and the TPI. In FIG. 4, the recording densities RD0 to RDN may have the same values or different values.

In the example illustrated in FIG. 4, the recording density/energy controller 630 adjusts recording densities corresponding to the heads 15-0 to 15-N, to the recording densities RD0 to RDN, respectively. The recording density/energy controller 630 performs recording at the recording densities RD0 to RDN corresponding to the heads 15-0 to 15-N, respectively.

Figure 5:
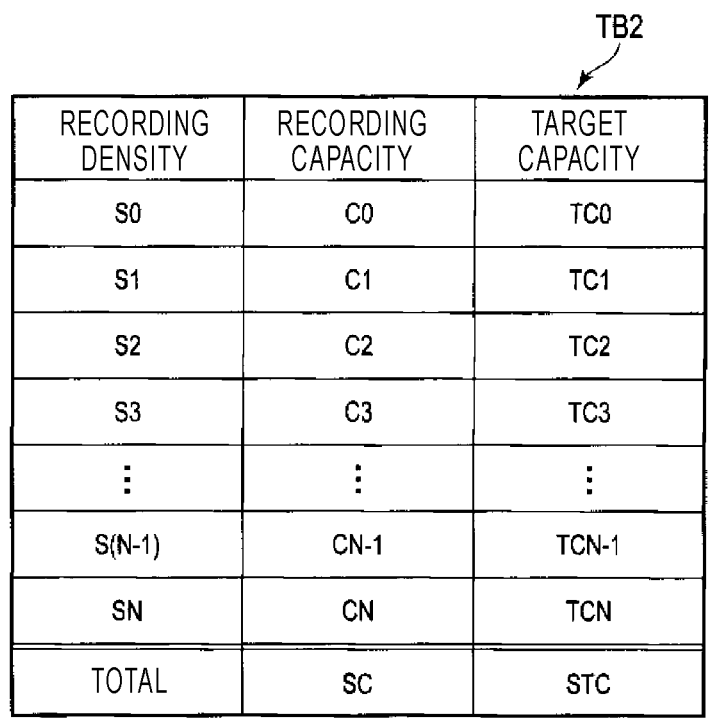
FIG. 5 is an example of a recording capacity table.

FIG. 5 is a view illustrating an example of a table TB2 of the recording capacity of a recording surface of each disk 10. In FIG. 5, the table TB2 includes: a front surface S0 and a back surface S1 of a disk 10-1, a front surface S2 and a back surface S3 of a disk 10-2, . . . , a front surface SN-1 and a back surface SN of a disk 10-N; recording capacities C0, C1, C2, C3, . . . , CN-1, and CN corresponding to the recording surfaces S0, S1, S2, S3, . . . , S(N−1), and SN, respectively; recording capacities as targets (hereinafter, may be referred to as objective capacities or target capacities) TC0, TC1, TC2, TC3, TCN-1, and TCN corresponding to the recording surfaces S0, S1, S2, S3, . . . , S(N−1), and SN, respectively; a total capacity SC corresponding to the sum of the recording capacities C0 to CN corresponding to the recording surfaces S0 to SN, respectively; and a target total capacity STC corresponding to the sum of the target capacities TC0 to TCN corresponding to the recording surfaces S0 to SN, respectively. For example, the recording surfaces S0, S1, S2, S3, . . . , S(N−1), and SN illustrated in the table TB2 correspond to the recording surfaces S0, S1, S2, S3, . . . , S(N−1), and SN illustrated in FIG. 3, respectively. That is, the recording capacity C0 corresponds to a recording capacity of data writable by the head 15-0 on the recording surface S0, the recording capacity C1 corresponds to a recording capacity of data writable by the head 15-1 on the recording surface S1, the recording capacity C2 corresponds to a recording capacity of data writable by the head 15-2 on the recording surface S2, the recording capacity C3 corresponds to a recording capacity of data writable by the head 15-3 on the recording surface S3, the recording capacity CN-1 corresponds to a recording capacity of data writable by the head 15-(N−1) on the recording surface S(N−1), and the recording capacity CN corresponds to a recording capacity of data writable by the head 15-N on the recording surface SN. In FIG. 5, the recording capacities C0 to CN may be the same or different. In FIG. 5, the target capacities TC0 to TCN may have the same values or different values.

In the example illustrated in FIG. 5, the recording density/energy controller 630 determines whether the total capacity SC of the recording capacities C0 to CN corresponding to the recording surfaces S0 to SN, respectively, is smaller or larger than the target total capacity STC of the target capacities TC0 to TCN corresponding to the recording surfaces S0 to SN, respectively.

Figure 6:
FIG. 6 is an example of an assist amount table.

FIG. 6 is a view illustrating an example of a table TB3 of the assist amount of an energy to be generated from an assist element of each head 15. In FIG. 6, the table TB3 illustrates: the heads 15-0, 15-1, 15-2, 15-3, . . . , 15-(N−1), and 15-N; assist amounts AS0, AS1, AS2, AS3, . . . , ASN-1, and ASN corresponding to the heads 15-0, 15-1, 15-2, 15-3, . . . , 15-(N−1), and 15-N, respectively; upper limit assist amounts MA0, MA1, MA2, MA3, . . . , MAN-1, and MAN corresponding to the heads 15-0, 15-1, 15-2, 15-3, . . . , 15-(N−1), and 15-N, respectively; and assist amount ratios 65%, 86%, 79%, 70%, . . . , 67%, and 76% of the assist amounts AS0, AS1, AS2, AS3, . . . , ASN-1, and ASN with respect to the upper limit assist amounts MA0, MA1, MA2, MA3, . . . , MAN-1, and MAN, respectively.

In the example illustrated in FIG. 6, when determining that the total capacity SC illustrated in FIG. 5 is larger than the target total capacity STC, the recording density/energy controller 630 selects the head 15-1 corresponding to the largest assist amount ratio (86%), as the target head 15-1, from the table TB3. After selecting the target head 15-1, the recording density/energy controller 630 reduces the recording density RD1 corresponding to the target head 15-1 illustrated in FIG. 4, and reduces the assist amount AS1 of an energy to be generated from the assist element of the target head 15-1 illustrated in FIG. 6.

After reducing the recording density RD1 corresponding to the target head 15-1 and the assist amount AS1 of the energy to be generated from the assist element of the target head 15-1, the recording density/energy controller 630 determines whether the total capacity is larger or smaller than the target total capacity STC. When determining that the total capacity is larger than the target total capacity STC, the recording density/energy controller 630 selects the head 15-2 corresponding to the next largest assist amount ratio (79%), as the target head 15-2, from the table TB3. After selecting the target head 15-2, the recording density/energy controller 630 reduces the recording density RD2 corresponding to the target head 15-2 illustrated in FIG. 4, and reduces the assist amount AS2 of an energy to be generated from the assist element of the target head 15-2 illustrated in FIG. 6.

For example, the recording density/energy controller 630 repeats a process of selecting a target head among the heads 15-0 to 15-N except for the heads 15-1 and 15-2, reducing the assist amount of an energy to be generated from the assist element of the target head, and reducing the recording density corresponding to the target head until the total capacity matches the target total capacity STC.

In the example illustrated in FIG. 6, when determining that the total capacity SC illustrated in FIG. 5 is smaller than the target total capacity STC, the recording density/energy controller 630 selects the head 15-(N−1) corresponding to the smallest assist amount ratio (67%), as the target head 15-(N−1), from the table TB3. After selecting the target head 15-(N−1), the recording density/energy controller 630 increases the recording density RDN-1 corresponding to the target head 15-(N−1) illustrated in FIG. 4, and increases the assist amount ASN-1 of an energy to be generated from the assist element of the target head 15-(N−1) illustrated in FIG. 6.

After increasing the recording density RDN-1 corresponding to the target head 15-(N−1) and the assist amount ASN-1 of the energy to be generated from the assist element of the target head 15-(N−1), the recording density/energy controller 630 determines whether the total capacity is larger or smaller than the target total capacity STC. When determining that the total capacity is smaller than the target total capacity STC, the recording density/energy controller 630 selects the head 15-3 corresponding to the next smallest assist amount ratio (70%), as the target head 15-3, from the table TB3. After selecting the target head 15-3, the recording density/energy controller 630 increases the recording density RD3 corresponding to the target head 15-3 illustrated in FIG. 4, and increases the assist amount AS3 of an energy to be generated from the assist element of the target head 15-3 illustrated in FIG. 6.

For example, the recording density/energy controller 630 repeats a process of selecting a target head among the heads 15-0 to 15-N except for the heads 15-3 and 15-(N−1), increasing the recording density corresponding to the target head, and increasing the assist amount of an energy to be generated from the assist element of the target head until the total capacity matches the target total capacity STC.

Figure 7:
FIG. 7 is an example of an element energy amount table.

FIG. 7 is a view illustrating an example of a table TB4 of the element energy amount of an element energy to be supplied to an assist element of each head 15. In FIG. 7, the table TB4 illustrates: the heads 15-0, 15-1, 15-2, 15-3, . . . , 15-(N−1), and 15-N; element energy amounts E0, E1, E2, E3, . . . , EN-1, and EN corresponding to the heads 15-0, 15-1, 15-2, 15-3, . . . , 15-(N−1), and 15-N, respectively; upper limit energy amounts ME0, ME1, ME2, ME3, . . . , MEN-1, and MEN corresponding to the heads 15-0, 15-1, 15-2, 15-3, . . . , 15-(N−1), and 15-N, respectively; and energy amount ratios 65%, 86%, 79%, 70%, . . . , 67%, and 76% of the element energy amounts E0, E1, E2, E3, . . . , EN-1, and EN with respect to the upper limit energy amounts ME0, ME1, ME2, ME3, . . . , MEN-1, and MEN, respectively.

In the example illustrated in FIG. 7, when determining that the total capacity SC illustrated in FIG. 5 is larger than the target total capacity STC, the recording density/energy controller 630 selects the head 15-1 corresponding to the largest energy amount ratio (86%), as the target head 15-1, from the table TB4. After selecting the target head 15-1, the recording density/energy controller 630 reduces the element energy amount E1 of an element energy to be supplied to the assist element of the target head 15-1 illustrated in FIG. 7, and reduces the recording density RD1 corresponding to the target head 15-1 illustrated in FIG. 4. Also, the recording density/energy controller 630 may reduce the assist amount AS1 of an energy to be generated from the assist element of the target head 15-1 illustrated in FIG. 6, reduce the element energy amount E1 of an element energy to be supplied to the assist element of the target head 15-1 illustrated in FIG. 7, and reduce the recording density RD1 corresponding to the target head 15-1 illustrated in FIG. 4.

After reducing the recording density RD1 corresponding to the target head 15-1 and the element energy amount E1 of the element energy to be supplied to the assist element of the target head 15-1, the recording density/energy controller 630 determines whether the total capacity is larger or smaller than the target total capacity STC. When determining that the total capacity is larger than the target total capacity STC, the recording density/energy controller 630 selects the head 15-2 corresponding to the next largest energy amount ratio (79%), as the target head 15-2, from the table TB4. After selecting the target head 15-2, the recording density/energy controller 630 reduces the recording density RD2 corresponding to the target head 15-2 illustrated in FIG. 4, and reduces the element energy amount E2 of an element energy to be supplied to the assist element of the target head 15-2 illustrated in FIG. 7. Also, the recording density/energy controller 630 may reduce the recording density RD2 corresponding to the target head 15-2 illustrated in FIG. 4, reduce the assist amount AS2 of an energy to be generated from the assist element of the target head 15-2 illustrated in FIG. 6, and reduce the element energy amount of an element energy to be supplied to the assist element of the target head 15-2 illustrated in FIG. 7.

For example, the recording density/energy controller 630 repeats a process of selecting a target head among the heads 15-0 to 15-N except for the heads 15-1 and 15-2, reducing the recording density corresponding to the target head, and reducing the element energy amount of an element energy to be supplied to the assist element of the target head until the total capacity matches the target total capacity STC. Also, for example, the recording density/energy controller 630 may repeat a process of selecting a target head among the heads 15-0 to 15-N except for the heads 15-1 and 15-2, reducing the recording density corresponding to the target head, reducing the assist amount of an energy to be generated from the assist element of the target head, and reducing the element energy amount of an element energy to be supplied to the assist element of the target head according to a change amount of the assist amount until the total capacity matches the target total capacity STC.

In the example illustrated in FIG. 7, when determining that the total capacity SC illustrated in FIG. 5 is smaller than the target total capacity STC, the recording density/energy controller 630 selects the head 15-(N−1) corresponding to the smallest energy amount ratio (67%), as the target head 15-(N−1), from the table TB4. After selecting the target head 15-(N−1), the recording density/energy controller 630 increases the recording density RDN-1 corresponding to the target head 15-(N−1) illustrated in FIG. 4, and increases the element energy amount EN-1 of an element energy to be supplied to the assist element of the target head 15-(N−1). Also, the recording density/energy controller 630 may increase the recording density RDN-1 corresponding to the target head 15-(N−1) illustrated in FIG. 4, increase the assist amount ASN-1 of an energy to be generated from the assist element of the target head 15-(N−1) illustrated in FIG. 6, and increase the element energy amount EN-1 of an element energy to be supplied to the assist element of the target head 15-(N−1) according to a change amount of the assist amount ASN-1.

After increasing the recording density RDN-1 corresponding to the target head 15-(N−1) and the element energy amount EN-1 of the element energy to be supplied to the assist element of the target head 15-(N−1), the recording density/energy controller 630 determines whether the total capacity is larger or smaller than the target total capacity STC. When determining that the total capacity is smaller than the target total capacity STC, the recording density/energy controller 630 selects the head 15-3 corresponding to the next smallest energy amount ratio (70%), as the target head 15-3, from the table TB4. The recording density/energy controller 630 increases the recording density RD3 corresponding to the target head 15-3 illustrated in FIG. 4, and increases the element energy amount E3 of an element energy to be supplied to the assist element of the target head 15-3. Also, the recording density/energy controller 630 may increase the recording density RD3 corresponding to the target head 15-3 illustrated in FIG. 4, increase the assist amount AS3 of an energy to be generated from the assist element of the target head 15-3 illustrated in FIG. 6, and increase the element energy amount of an element energy to be supplied to the assist element of the target head 15-3 according to a change amount of the assist amount AS3.

For example, the recording density/energy controller 630 repeats a process of selecting a target head among the heads 15-0 to 15-N except for the heads 15-3 and 15-(N−1), increasing the recording density corresponding to the target head, and increasing the element energy amount of an element energy to be supplied to the assist element of the target head until the total capacity matches the target total capacity STC. Also, for example, the recording density/energy controller 630 may repeat a process of selecting a target head among the heads 15-0 to 15-N except for the heads 15-3 and 15-(N−1), increasing the recording density corresponding to the target head, increasing the assist amount of an energy to be generated from the assist element of the target head, and increasing the element energy amount of an element energy to be supplied to the assist element of the target head according to a change amount of the assist amount until the total capacity matches the target total capacity STC.

Figure 8:
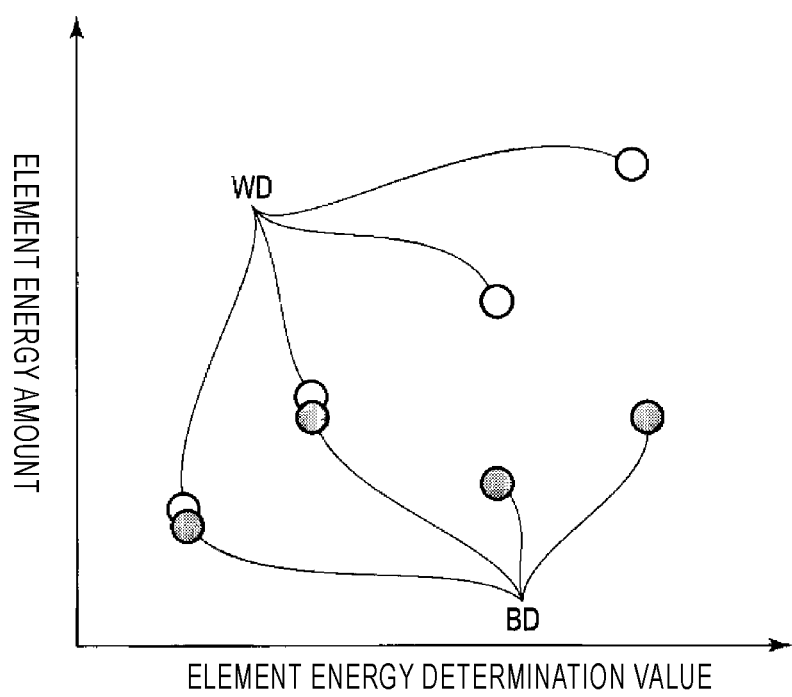
FIG. 8 illustrates the relationship between an element energy amount and an element energy determination value.

FIG. 8 is a view illustrating an example of the relationship between an element energy amount and an element energy determination value according to the present embodiment. In FIG. 8, the vertical axis indicates an average element energy amount supplied to assist elements mounted in the heads 15 of the magnetic disk drive 1, respectively, for example, an assist current or an assist voltage, and the horizontal axis indicates an average element energy determination value of the plurality of assist elements mounted in the plurality of heads 15 of the magnetic disk drive 1, for example, an element resistance value. The element energy amount on the vertical axis of FIG. 8 increases with the progress in the direction toward the arrow tip. The element energy determination value on the horizontal axis of FIG. 8 increases with the progress in the direction toward the arrow tip. In FIG. 8, a white circle WD indicates a predetermined element energy amount with respect to a predetermined element energy determination value when the element energy amount is not adjusted, and a black circle BD indicates a predetermined element energy amount with respect to a predetermined element energy determination value when the element energy amount is adjusted.

In the example illustrated in FIG. 8, the white circle WD increases as the element energy determination value increases. That is, as described above, for example, when the element energy amount (or the assist amount as illustrated in FIG. 6) is not adjusted as illustrated in FIG. 7, the element energy amount increases in proportion to the element energy determination value. The black circle BD does not correlate with the element energy determination value. That is, as described above, for example, when the element energy amount (or the assist amount as illustrated in FIG. 6) is adjusted as illustrated in FIG. 7, the element energy amount does not correlate with the element energy determination value.

Figure 9:
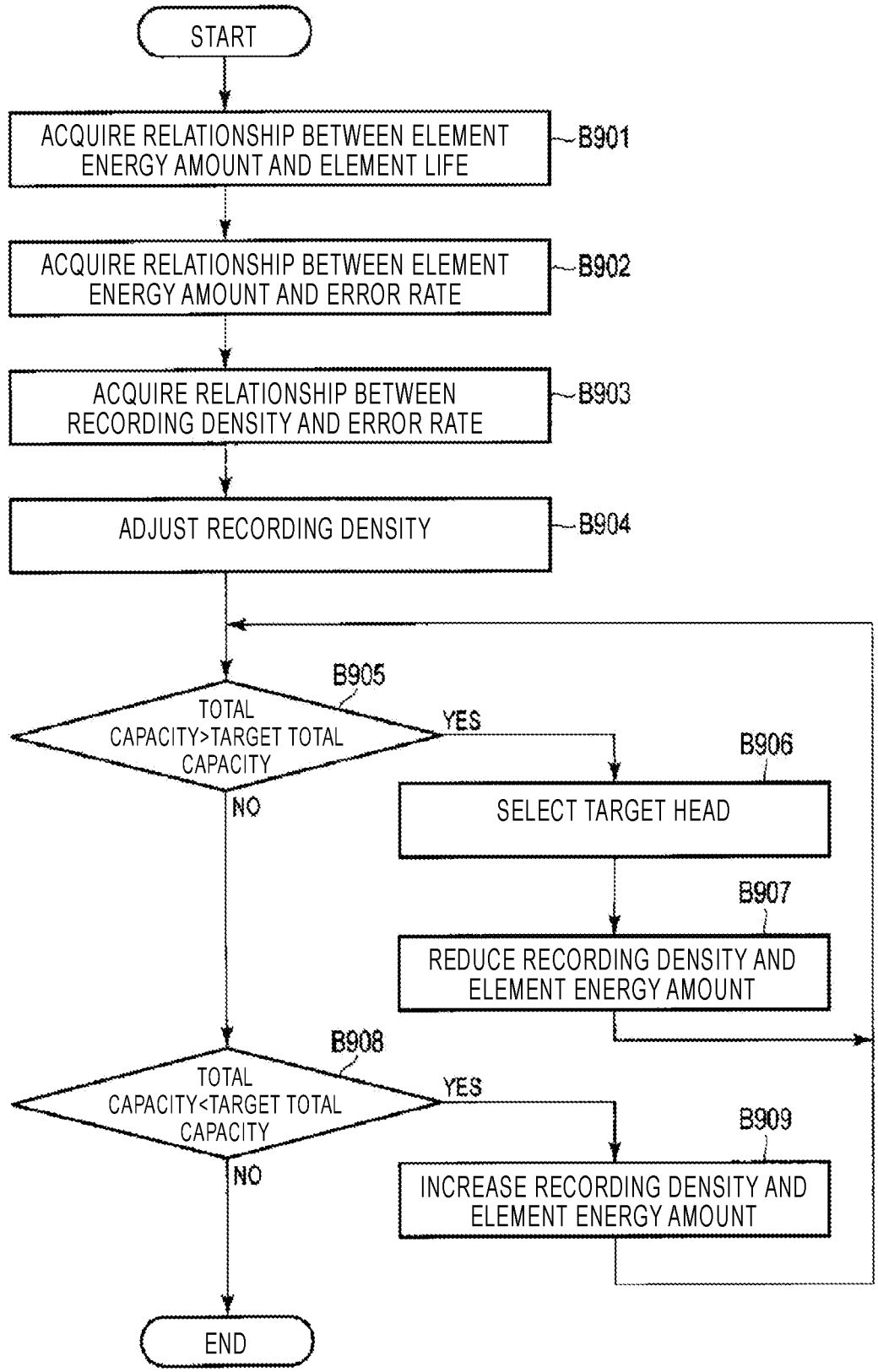
FIG. 9 is a flow chart illustrating an example of a method of adjusting head characteristics according to the first embodiment.

FIG. 9 is a flow chart illustrating an example of a method of adjusting the head 15 according to the present embodiment.

The MPU 60 acquires the relationship between the element energy amount and the element life (B901), acquires the relationship between the element energy amount and the error rate (B902), and acquires the relationship between the recording density and the error rate (B903). The MPU 60 may acquire the relationship between the element energy amount and the element life, the relationship between the element energy and the error rate, and the relationship between the recording density and the error rate from tables of various data that is not directly measured, for example, various data obtained during mass production of magnetic disk drives. The MPU 60 adjusts the recording densities, for example, a BPI and a TPI, to initial recording densities, for example, an initial BPI and an initial TPI (B904). The MPU 60 determines whether the total capacity is larger than the target total capacity (B905). When determining that the total capacity is larger than the target total capacity (YES in B905), the MPU 60 selects a target head 15 from the plurality of heads 15 (B906). For example, the MPU 60 calculates a change amount of each element life of each assist element of each head 15, which corresponds to a change amount of an element energy amount of an element energy to be supplied to each assist element of each head 15, on the basis of the relationship between the element energy amount and the element life, and selects the target head with a higher priority from the plurality of heads 15 on the basis of the change amount of the element life corresponding to the change amount of the element energy amount of the element energy to be supplied to each assist element of each head 15. In another example, the MPU 60 may select the target head with the higher priority from the plurality of heads 15 on the basis of an energy amount ratio corresponding to each assist element of each head 15. In still another example, the MPU 60 may select the target head with the higher priority from the plurality of heads 15 on the basis of an assist amount ratio corresponding to each assist element of each head 15. After selecting the target head in B906, the MPU 60 reduces the recording density corresponding to the target head 15, for example, the BPI, reduces the element energy amount (e.g., the assist current value or the assist voltage value) of the element energy (e.g., the assist current or the assist voltage) to be supplied to the assist element of the target head 15 (B907), and proceeds to the process in B905. When determining that the total capacity is not larger than the target total capacity (NO in B905), the MPU 60 determines whether the total capacity is smaller than the target total capacity (B908). When determining that the total capacity is smaller than the target total capacity (YES in B908), the MPU 60 increases the recording density corresponding to the target head 15, for example, the BPI, increases the element energy amount (e.g., the assist current value or the assist voltage value) of the element energy (e.g., the assist current or the assist voltage) to be supplied to the assist element of the target head 15 (B909), and proceeds to the process in B905. When determining that the total capacity is not smaller than the target total capacity (NO in B908), the MPU 60 ends the process. That is, when determining that the total capacity matches the target total capacity, the MPU 60 ends the process.

According to the present embodiment, the magnetic disk drive 1 includes the plurality of heads 15 having the assist elements (e.g., the STOs 200) each of which generates, on the disk 10, a predetermined amount of assist energy (e.g., a high-frequency magnetic field) when a predetermined element energy amount (e.g., an assist current value or an assist voltage value) of element energy (e.g., an assist current or an assist voltage) is supplied. The magnetic disk drive 1 selects the target head 15 from the plurality of heads 15. The magnetic disk drive 1 determines whether the total capacity is larger than the target total capacity. When determining that the total capacity is larger than the target total capacity, the magnetic disk drive 1 reduces the recording density corresponding to the target head 15, for example, a BPI, and reduces the element energy amount of the element energy to be supplied to the assist element of the target head 15. The magnetic disk drive 1 repeats a process of selecting the target head 15 from the plurality of heads 15, reducing the recording density corresponding to the target head 15, and reducing the element energy amount of the element energy to be supplied to the assist element of the target head 15 until the total capacity matches the target total capacity. When determining that the total capacity is not larger than the target total capacity, the magnetic disk drive 1 determines whether the total capacity is smaller than the target total capacity. When determining that the total capacity is smaller than the target total capacity, the magnetic disk drive 1 increases the recording density corresponding to the target head 15, and increases the element energy amount of the element energy to be supplied to the assist element of the target head 15. The magnetic disk drive 1 repeats a process of selecting the target head 15 from the plurality of heads 15, increasing the recording density corresponding to the target head 15, and increasing the element energy amount of the element energy to be supplied to the assist element of the target head 15 until the total capacity matches the target total capacity. The magnetic disk drive 1 may adjust the recording density of a predetermined head 15 and the element energy amount of an element energy to be supplied to an assist element of the head 15 so as to enhance the quality of data, and improve the element life of the assist element. Thus, the magnetic disk drive 1 may enhance the reliability.

Next, descriptions will be made on the magnetic disk drive 1 according to other embodiments and modifications. In other embodiments and modifications, the same parts as those in the above described first embodiment will be denoted by the same reference numerals and detailed descriptions thereof will be omitted.

(Modification 1) The magnetic disk drive 1 according to Modification 1 is different from that of the above described first embodiment in the method of adjusting the head 15.

The recording density/energy controller 630 detects the sum of recording capacities in predetermined areas of disks 10 (hereinafter, may be referred to as a partial total capacity). For example, after adjusting the recording density corresponding to each head 15, the recording density/energy controller 630 determines whether the partial total capacity matches a partial total capacity as a target (hereinafter, may be referred to as a target partial capacity). Also, the partial total capacity may be the sum of recording capacities on a part of recording surfaces of all disks 10 of the magnetic disk drive 1, may be the sum of recording capacities on a part of recording surfaces of several disks 10 of the magnetic disk drive 1, or may be a recording capacity on a part of a recording surface of one disk 10 of the magnetic disk drive 1.

When determining that the partial total capacity does not match the target partial capacity, the recording density/energy controller 630 selects a target head 15 from the plurality of heads 15, adjusts (or changes) a recording density (e.g., a BPI) when data is written on the disk 10 corresponding to the target head 15 by the target head 15, and adjusts (or changes) an element energy amount (e.g., an assist current value or an assist voltage value) of an element energy (e.g., an assist current or an assist voltage) to be supplied to the assist element (e.g., the STO) of the target head 15. Also, the recording density/energy controller 630 may be configured to adjust (or change) at least one of the recording density corresponding to the target head 15 and the element energy amount to be supplied to the assist element of the target head 15 when it is determined that the partial total capacity does not match the target partial capacity. For example, when determining that the partial total capacity does not match the target partial capacity, the recording density/energy controller 630 may adjust (or change) only the recording density corresponding to the target head 15.

The recording density/energy controller 630 repeats a process of selecting the target head 15 from the plurality of heads 15, adjusting the recording density corresponding to the target head 15, and adjusting the element energy amount of the element energy to be supplied to the assist element of the target head 15 until the partial total capacity matches the target partial capacity. For example, the recording density/energy controller 630 repeats a process of selecting the target head 15 in descending order of priority from the plurality of heads 15, adjusting the recording density corresponding to the target head 15, and adjusting the element energy amount of the element energy to be supplied to the assist element of the target head 15 until the partial total capacity matches the target partial capacity.

For example, after adjusting the recording density (e.g., the BPI or the TPI) corresponding to each head 15, the recording density/energy controller 630 determines whether the partial total capacity is larger than the target partial capacity. For example, when it is determined that the partial total capacity is larger than the target partial capacity, the recording density/energy controller 630 calculates a change amount of an element life of each of assist elements, which corresponds to a change amount of an element energy amount (e.g., an assist current value or an assist voltage value) of an element energy (e.g., an assist current or an assist voltage) to be supplied to each of the assist elements (e.g., the STOs 200) of the plurality of heads 15, on the basis of the relationship between the element energy amount and the element life. On the basis of the calculated change amount of the element life of each of the heads 15, the recording density/energy controller 630 selects a head 15 in which the element life is most improved when the element energy with a predetermined element energy amount of change amount is reduced, as a target head 15, from the plurality of heads 15.

When determining that the partial total capacity is larger than the target partial capacity, the recording density/energy controller 630 reduces the recording density (e.g., a BPI) corresponding to the target head 15, and reduces the element energy amount of the element energy to be supplied to the assist element of the target head 15. Also, when determining that the partial total capacity is larger than the target partial capacity, the recording density/energy controller 630 may reduce the recording density (e.g., the BPI) corresponding to the target head 15, and reduce the element energy amount of the element energy to be supplied to the assist element of the target head 15 according to a change amount of the recording density corresponding to the target head 15. When determining that the partial total capacity is larger than the target partial capacity, the recording density/energy controller 630 may reduce the element energy amount of the element energy to be supplied to the assist element of the target head 15, and reduce the recording density (e.g., the BPI) corresponding to the target head 15 according to a change amount of the element energy amount corresponding to the target head 15. For example, when determining that the partial total capacity is larger than the target partial capacity, the recording density/energy controller 630, on the basis of the relationship between the recording density and the element energy amount, reduces the recording density corresponding to the target head 15, and reduces the element energy amount of the element energy to be supplied to the assist element of the target head 15 such that a change amount of an error rate corresponding to a change amount of the recording density may match a change amount of an error rate corresponding to a change amount of the element energy amount. The recording density/energy controller 630 repeats a process of selecting the target head 15 from the plurality of heads 15, reducing the recording density corresponding to the target head 15, and reducing the element energy amount of the element energy to be supplied to the assist element of the target head 15 until the partial total capacity matches the target partial capacity.

For example, when determining that the partial total capacity is not larger than the target partial capacity, the recording density/energy controller 630 determines whether the partial total capacity is smaller than the target partial capacity. When determining that the partial total capacity is smaller than the target partial capacity, the recording density/energy controller 630 calculates a change amount of an element life of each of the heads 15, which corresponds to a change amount of an element energy amount (e.g., an assist current value or an assist voltage value) of an element energy (e.g., an assist current or an assist voltage) to be supplied to each of assist elements (e.g., the STOs 200) of the heads 15, on the basis of the relationship between the element energy amount and the element life. On the basis of the calculated change amount of the element life of each of the heads 15, the recording density/energy controller 630 selects a head 15 in which the element life is most unchanged when the element energy with a predetermined element energy amount of change amount is increased, as a target head 15.

For example, when determining that the partial total capacity is not larger than the target partial capacity, the recording density/energy controller 630 increases the recording density corresponding to the target head 15, and increases the element energy amount of the element energy to be supplied to the assist element of the target head 15. Also, when determining that the partial total capacity is not larger than the target partial capacity, the recording density/energy controller 630 may increase only the recording density corresponding to the target head 15. When determining that the partial total capacity is not larger than the target partial capacity, the recording density/energy controller 630 may increase the recording density corresponding to the target head 15, and increase the element energy amount of the element energy to be supplied to the assist element of the target head 15 according to a change amount of the recording density corresponding to the target head 15. When determining that the partial total capacity is not larger than the target partial capacity, the recording density/energy controller 630 may increase the element energy amount of the element energy to be supplied to the assist element of the target head 15, and increase the recording density corresponding to the target head 15 according to a change amount of the element energy amount corresponding to the target head 15. The recording density/energy controller 630 repeats a process of selecting the target head 15 from the plurality of heads 15, increasing the recording density corresponding to the target head 15, and increasing the element energy amount to be supplied to the assist element of the target head 15 according to a change amount of the recording density corresponding to the target head 15 until the partial total capacity matches the target partial capacity.

Figure 10:
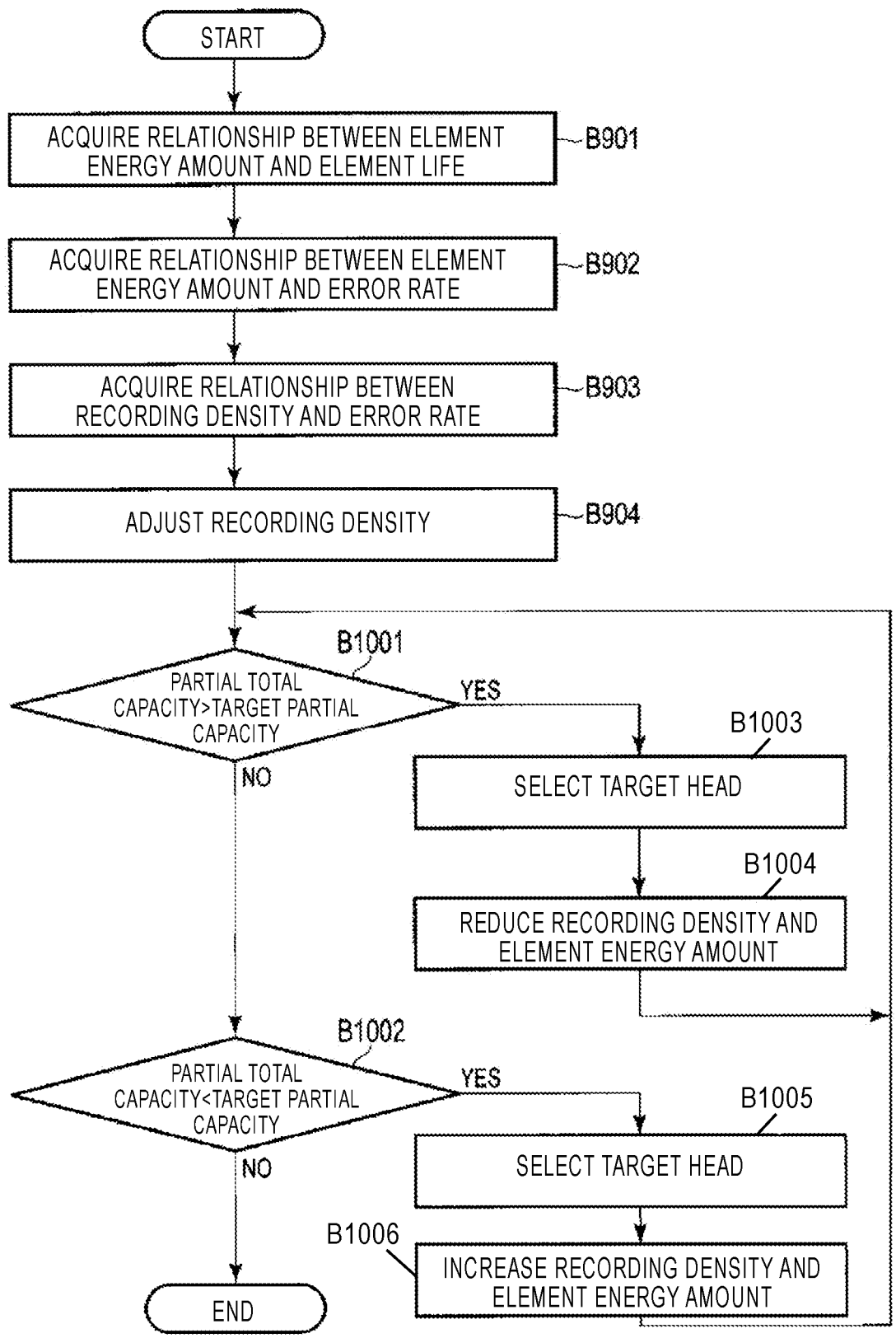
FIG. 10 is a flow chart illustrating an example of a method of adjusting head characteristics according to Modification 1.

FIG. 10 is a flow chart illustrating an example of a method of adjusting the head 15 according to Modification 1.

The MPU 60 acquires the relationship between the element energy amount and the element life (B901), acquires the relationship between the element energy amount and the error rate (B902), and acquires the relationship between the recording density and the error rate (B903). Also, the MPU 60 may acquire the relationship between the element energy amount and the element life, the relationship between the element energy and the error rate, and the relationship between the recording density and the error rate from tables of various data that is not directly measured, for example, various data obtained during mass production of magnetic disk drives. The MPU 60 adjusts a recording density (B904), and determines whether the partial total capacity is larger than the target partial capacity (B1001). When determining that the partial total capacity is larger than the target partial capacity (YES in B1001), the MPU 60 selects a target head 15 from the plurality of heads 15 (B1003) in the same manner as in B906, and reduces the recording density corresponding to the target head 15, reduces the element energy amount of the element energy to be supplied to the assist element of the target head 15 (B1004), and proceeds to the process in B1001. When determining that the partial total capacity is not larger than the target partial capacity (NO in B1001), the MPU 60 determines whether the partial total capacity is smaller than the target partial capacity (B1002). When determining that the partial total capacity is smaller than the target partial capacity (YES in B1002), the MPU 60 selects a target head 15 from the plurality of heads 15 (B1005) in the same manner as in B906, and increases the recording density corresponding to the target head 15, increases the element energy amount of the element energy to be supplied to the assist element of the target head 15 (B1006), and proceeds to the process in B1001. When determining that the partial total capacity is not smaller than the target partial capacity (NO in B1002), the MPU 60 ends the process. That is, when determining that the partial total capacity matches the target partial capacity, the MPU 60 ends the process.

According to Modification 1, the magnetic disk drive 1 determines whether the partial total capacity is larger than the target partial capacity. When determining that the partial total capacity is larger than the target partial capacity, the magnetic disk drive 1 reduces the recording density corresponding to the target head 15, for example, a BPI, and reduces the element energy amount of the element energy to be supplied to the assist element of the target head 15. The magnetic disk drive 1 repeats a process of selecting the target head 15 from the plurality of heads 15, reducing the recording density corresponding to the target head 15, and reducing the element energy amount of the element energy to be supplied to the assist element of the target head 15 until the partial total capacity matches the target partial capacity. When determining that the partial total capacity is not larger than the target partial capacity, the magnetic disk drive 1 determines whether the partial total capacity is smaller than the target partial capacity. When determining that the partial total capacity is smaller than the target partial capacity, the magnetic disk drive 1 increases the recording density corresponding to the target head 15, and increases the element energy amount of the element energy to be supplied to the assist element of the target head 15. The magnetic disk drive 1 repeats a process of selecting the target head 15 from the plurality of heads 15, increasing the recording density corresponding to the target head 15, and increasing the element energy amount of the element energy to be supplied to the assist element of the target head 15 until the partial total capacity matches the target partial capacity. Thus, the magnetic disk drive 1 may enhance the reliability.

Second Embodiment

The magnetic disk drive 1 according to a second embodiment is different from the magnetic disk drive 1 in the first embodiment and the modification described above in the method of adjusting the head 15.

The measurement unit 620 measures an amount of influence on an error rate corresponding to a present area (hereinafter, may be referred to as an influence amount of a recording density) when data is written (hereinafter, referred to as adjacent writing) at a recording density corresponding to each head 15 on an area (hereinafter, may be referred to as an adjacent area) radially adjacent to a predetermined area (hereinafter, may be referred to as a present area). The term "adjacent" includes not only the meaning "continuous," but also the meaning "things are separated to such an extent that they may be considered substantially continuous." The influence amount of the recording density corresponds to, for example, a change amount of the error rate in the present area during adjacent writing of data in the adjacent area. For example, the measurement unit 620 measures an amount of influence on an error rate corresponding to a present track (hereinafter, may be referred to as an influence amount of a TPI) when adjacent writing is performed at a TPI corresponding to each head 15 on a track (hereinafter, may be referred to as an adjacent track) radially adjacent to a predetermined track (hereinafter, may be referred to as a present track). The influence amount of the TPI corresponds to, for example, a change amount of a BER on the present track during adjacent writing of data on the adjacent track.

The measurement unit 620 measures an influence amount of a recording density, for example, an influence amount of a TPI, in each area of each disk 10 on which data is written (assisted recording) by each head 15 in which a predetermined element energy amount of element energy is supplied to each assist element. The measurement unit 620 acquires the relationship between the element energy amount and the influence amount of the recording density corresponding to each head 15, on the basis of the influence amount of the recording density, for example, the influence amount of the TPI, which is measured on each area of each disk 10 on which data is written by each head 15 in which the predetermined element energy amount of element energy is supplied to each assist element. That is, the measurement unit 620 measures a change amount of an error rate (hereinafter, may be referred to as a change amount of an adjacent write error rate), for example, a change amount of a BER in a present area when adjacent writing is performed in each area of each disk 10 on which data is written (assisted recording) by each head 15 in which a predetermined element energy amount of element energy is supplied to each assist element. The measurement unit 620 acquires the relationship between the element energy amount and the change amount of the adjacent write error rate corresponding to each head 15 on the basis of the change amount of the adjacent write error rate, which is measured on each area of each disk 10 on which data is written (assisted recording) by each head 15 in which the predetermined element energy amount of element energy is supplied to each assist element. The measurement unit 620 may record the measured characteristics of each head 15 and each disk 10, for example, the relationship between the element energy amount and the influence amount of the recording density corresponding to each head 15, and the relationship between the element energy amount and the change amount of the adjacent write error rate corresponding to the head 15 in a predetermined recording area, for example, a predetermined area of each disk 10, the system area SA of each disk 10, or the nonvolatile memory 80.

For example, when determining that the total capacity is larger than the target total capacity, the recording density/energy controller 630 reduces the BPI corresponding to the target head 15, reduces the element energy amount (e.g., the assist current value or the assist voltage value) of the element energy (e.g., the assist current or the assist voltage) to be supplied to the assist element (e.g., the STO 200) of the target head 15, and increases the TPI corresponding to the target head 15. For example, when determining that the total capacity is larger than the target total capacity, the recording density/energy controller 630, on the basis of the relationship between the recording density and the element energy amount, reduces the recording density corresponding to the target head 15, and reduces the element energy amount of the element energy to be supplied to the assist element of the target head 15 such that a change amount of an error rate (e.g., a BER) corresponding to a change amount of the recording density may match a change amount of an error rate corresponding to a change amount of the element energy amount. For example, on the basis of the relationship between the recording density and the element energy amount and the relationship between the element energy amount and the change amount of the adjacent write error rate, the recording density/energy controller 630 increases the TPI corresponding to the target head 15 such that an error rate in the present area (hereinafter, may be referred to as an adjacent write error rate), for example, a BER in the present area (hereinafter, may be referred to as an adjacent writing BER) when adjacent writing is performed by the target head 15 in which the adjusted element energy amount of element energy is supplied to the assist element may match an adjacent write error rate, for example, an adjacent writing BER, when adjacent writing is performed by the target head 15 at the adjusted TPI. The recording density/energy controller 630 repeats a process of selecting the target head 15 from the plurality of heads 15, reducing the BPI corresponding to the target head 15, reducing the element energy amount of the element energy to be supplied to the assist element of the target head 15, and increasing the TPI corresponding to the target head 15 until the total capacity matches the target total capacity.

For example, when determining that the total capacity is smaller than the target total capacity, the recording density/energy controller 630 increases the BPI corresponding to the target head 15, increases the element energy amount (e.g., the assist current value or the assist voltage value) of the element energy (e.g., the assist current or the assist voltage) to be supplied to the assist element (e.g., the STO 200) of the target head 15, and reduces the TPI corresponding to the target head 15. Also, when determining that the total capacity is smaller than the target total capacity, the recording density/energy controller 630 may increase only the BPI corresponding to the target head 15. That is, when determining that the total capacity is smaller than the target total capacity, the recording density/energy controller 630 may not increase the element energy amount of the element energy to be supplied to each assist element of each head 15. For example, when determining that the total capacity is smaller than the target total capacity, the recording density/energy controller 630, on the basis of the relationship between the recording density and the element energy amount, increases the recording density corresponding to the target head 15, and increases the element energy amount of the element energy to be supplied to the assist element of the target head 15 such that a change amount of an error rate (e.g., a BER) corresponding to a change amount of the recording density may match a change amount of an error rate corresponding to a change amount of the element energy amount. For example, on the basis of the relationship between the recording density and the element energy amount, and the relationship between the element energy amount and the change amount of the adjacent write error rate, the recording density/energy controller 630 reduces the TPI corresponding to the target head 15 such that an adjacent write error rate, for example, an adjacent writing BER, when adjacent writing is performed by the target head 15 in which the adjusted element energy amount of element energy is supplied to the assist element may match an adjacent write error rate, for example, an adjacent writing BER when adjacent writing is performed by the target head 15 at the adjusted TPI. The recording density/energy controller 630 repeats a process of selecting the target head 15 from the plurality of heads 15, increasing the BPI corresponding to the target head 15, increasing the element energy amount of the element energy to be supplied to the assist element of the target head 15, and reducing the TPI corresponding to the target head 15 until the total capacity matches the target total capacity.

Figure 11:
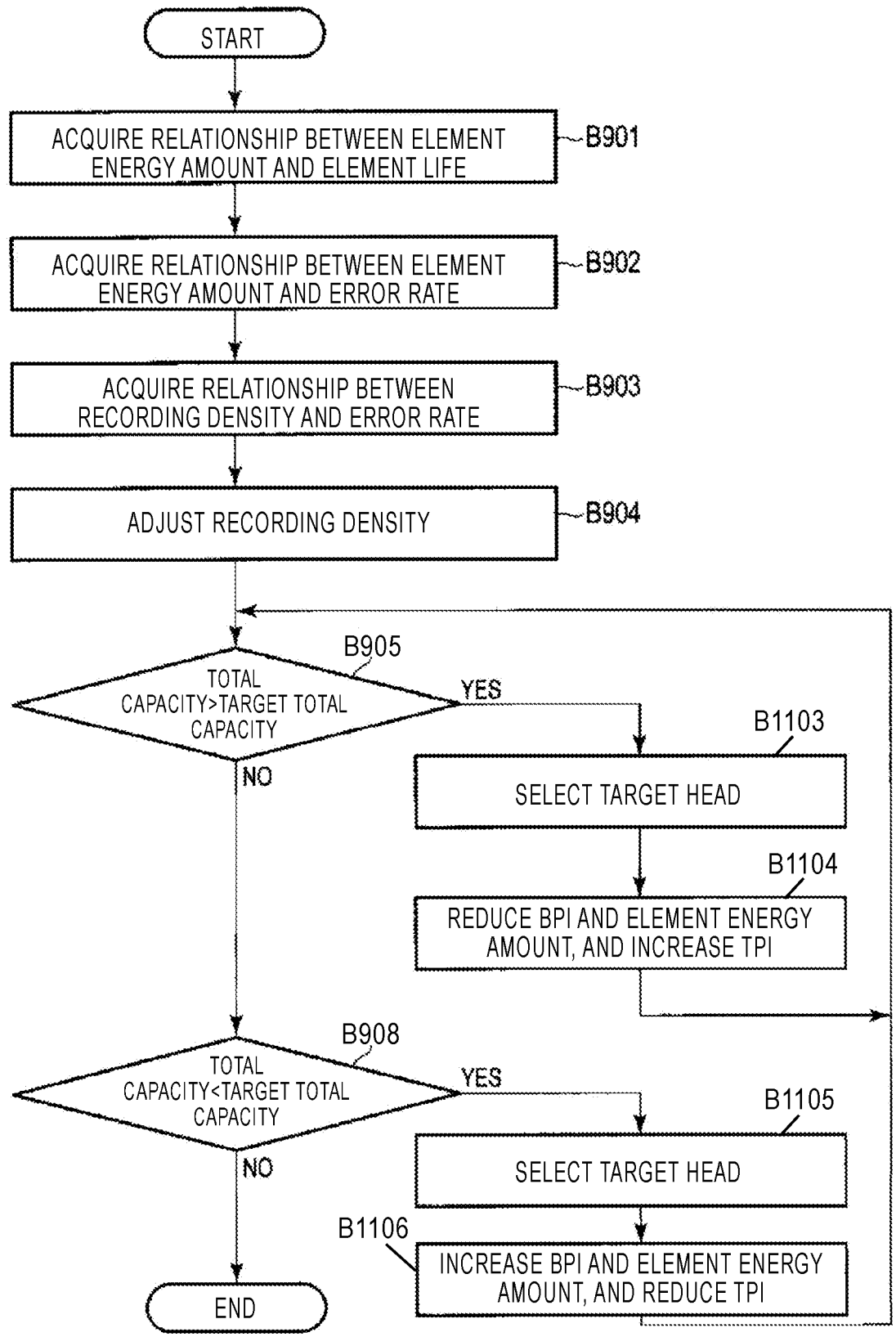
FIG. 11 is a flow chart illustrating an example of a method of adjusting head characteristics according to a second embodiment.

FIG. 11 is a flow chart illustrating an example of a method of adjusting the head 15 according to the second embodiment.

The MPU 60 acquires the relationship between the element energy amount and the element life (B901), acquires the relationship between the element energy amount and the error rate (B902), and acquires the relationship between the recording density and the error rate (B903). Also, the MPU 60 may acquire the relationship between the element energy amount and the element life, the relationship between the element energy and the error rate, and the relationship between the recording density and the error rate from tables of various data that is not directly measured, for example, various data obtained during mass production of magnetic disk drives. The MPU 60 adjusts a recording density to an initial recording density (B904), and determines whether the total capacity is larger than the target total capacity (B905). When determining that the total capacity is larger than the target total capacity (YES in B905), the MPU 60 selects a target head 15 from the plurality of heads 15 (B1103) in the same manner as in B906, and reduces the BPI corresponding to the target head 15, reduces the element energy amount of the element energy to be supplied to the assist element of the target head 15, increases the TPI corresponding to the target head 15 (B1104), and proceeds to the process in B905. For example, on the basis of the relationship between the recording density and the element energy amount, and the relationship between the element energy amount and the change amount of the adjacent write error rate, the MPU 60 increases the TPI corresponding to the target head 15 such that an adjacent write error rate when adjacent writing is performed by the target head 15 in which the adjusted element energy amount of element energy is supplied to the assist element may match an adjacent write error rate when adjacent writing is performed by the target head 15 at the adjusted TPI. When determining that the total capacity is not larger than the target total capacity (NO in B905), the MPU 60 determines whether the total capacity is smaller than the target total capacity (B908). When determining that the total capacity is smaller than the target total capacity (YES in B908), the MPU 60 selects a target head 15 from the plurality of heads 15 (B1105) in the same manner as in B906, and increases the BPI corresponding to the target head 15, increases the element energy amount of the element energy to be supplied to the assist element of the target head 15, reduces the TPI corresponding to the target head 15 (B1106), and proceeds to the process in B905. For example, on the basis of the relationship between the recording density and the element energy amount, and the relationship between the element energy amount and the change amount of the adjacent write error rate, the MPU 60 reduces the TPI corresponding to the target head 15 such that an adjacent write error rate when adjacent writing is performed by the target head 15 in which the adjusted element energy amount of element energy is supplied to the assist element may match an adjacent write error rate when adjacent writing is performed by the target head 15 at the adjusted TPI. When determining that the total capacity is not smaller than the target total capacity (NO in B908), the MPU 60 ends the process. That is, when determining that the total capacity matches the target total capacity, the MPU 60 ends the process.

According to the second embodiment, the magnetic disk drive 1 determines whether the total capacity is larger than the target total capacity. When determining that the total capacity is larger than the target total capacity, the magnetic disk drive 1 reduces the BPI corresponding to the target head 15, reduces the element energy amount of the element energy to be supplied to the assist element of the target head 15, and increases the TPI corresponding to the target head 15. For example, on the basis of the relationship between the recording density and the element energy amount, and the relationship between the element energy amount and the change amount of the adjacent write error rate, the magnetic disk drive 1 increases the TPI corresponding to the target head 15 such that an adjacent write error rate when adjacent writing is performed by the target head 15 in which the adjusted element energy amount of element energy is supplied to the assist element may match an adjacent write error rate when adjacent writing is performed by the target head 15 at the adjusted TPI. The magnetic disk drive 1 repeats a process of selecting the target head 15 from the plurality of heads 15, reducing the BPI corresponding to the target head 15, reducing the element energy amount of the element energy to be supplied to the assist element of the target head 15, and increasing the TPI corresponding to the target head 15 until the total capacity matches the target total capacity. When determining that the total capacity is smaller than the target total capacity, the magnetic disk drive 1 increases the BPI corresponding to the target head 15, increases the element energy amount of the element energy to be supplied to the assist element of the target head 15, and reduces the TPI corresponding to the target head 15. For example, on the basis of the relationship between the recording density and the element energy amount, and the relationship between the element energy amount and the change amount of the adjacent write error rate, the magnetic disk drive 1 reduces the TPI corresponding to the target head 15 such that an adjacent write error rate when adjacent writing is performed by the target head 15 in which the adjusted element energy amount of element energy is supplied to the assist element may match an adjacent write error rate when adjacent writing is performed by the target head 15 at the adjusted TPI. The magnetic disk drive 1 repeats a process of selecting the target head 15 from the plurality of heads 15, increasing the BPI corresponding to the target head 15, increasing the element energy amount of the element energy to be supplied to the assist element of the target head 15, and reducing the TPI corresponding to the target head 15 until the total capacity matches the target total capacity. The magnetic disk drive 1 may maintain the recording capacity of the disk 10, and improve the element life of the assist element. Thus, the magnetic disk drive 1 may enhance the reliability.

Third Embodiment

The magnetic disk drive 1 according to a third embodiment is different from the magnetic disk drive 1 in the first embodiment, the second embodiment, and Modification 1 described above in that data is writable in a thermally assisted magnetic recording (TAMR) type.

The magnetic disk drive 1 according to the third embodiment corresponds to a magnetic disk drive capable of writing data in a thermally assisted magnetic recording type.

Figure 12:
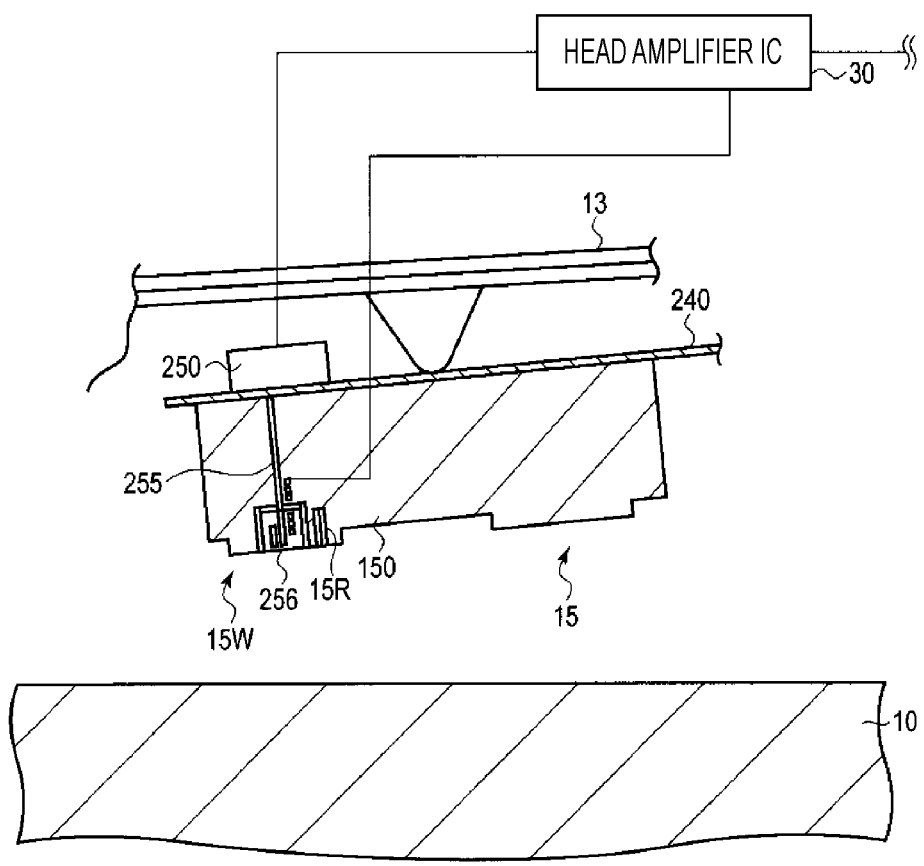
FIG. 12 is an enlarged sectional view illustrating a head according to a third embodiment.

FIG. 12 is an enlarged sectional view illustrating an example of the head 15 according to the present embodiment.

In the example illustrated in FIG. 12, the head 15 includes the write head 15W, the read head 15R, a light generating element (e.g., a laser diode) 250, a waveguide 255, and a near-field light irradiation element (a plasmon generator, a near-field transducer) 256 each of which is provided in the slider 150.

The light generating element 250 is a (laser) light source, and is provided above the slider 150 or on a gimbal 240. The light generating element 250 supplies light to the waveguide 255 when an element energy, for example, a current or a voltage, is supplied from the head amplifier IC 30, for example, an element energy control circuit. Also, the light generating element 250 may be provided at a place other than the slider 150 or the gimbal 240. For example, the light generating element 250 may be provided outside the arm 13 and the head 15. The waveguide 255 propagates the light generated by the light generating element 250 to the near-field light irradiation element 256.

The near-field light irradiation element 256 is provided at the lower end portion of the slider 150 facing the disk 10. The near-field light irradiation element 256 generates near-field light by the element energy, (e.g., laser light) that is generated by the light generating element 250 and is propagated by the waveguide 255, and irradiates the disk 10 with the near-field light when data is written on the disk 10. The radiating near-field light heats a recording layer of the disk 10, and reduces a coercive force of the recording layer of the disk 10. The near-field light irradiation element 256 includes a metal member. Also, instead of the near-field light irradiation element 256, a lens may be provided. The lens condenses the light that is generated by the light generating element 250 and is propagated by the waveguide 255, on the disk 10. In this manner, the magnetic disk drive 1 may perform high-density magnetic recording on the disk 10 which is a medium having a high coercive force, by irradiating the disk 10 with the near-field light generated from the near-field light irradiation element 256. Hereinafter, in certain cases, a configuration for executing the thermally assisted recording, for example, the light generating element (e.g., the laser diode) 250, the waveguide 255, and the near-field light irradiation element (the plasmon generator, the near-field transducer) 256, may be referred to as an assist element. Hereinafter, in certain cases, the phrase "a write operation of writing data while generating, on the disk 10, a predetermined amount (e.g., a predetermined intensity) of assist energy (e.g., near-field light) from the assist element by supplying a predetermined element energy amount (e.g., a current value or a voltage value) of element energy (e.g., a current or a voltage) to the assist element, for example, the light generating element 250 and the near-field light irradiation element 256" or "a write operation of writing data while generating, on the disk 10, a predetermined amount (e.g., a predetermined intensity) of assist energy (e.g., near-field light) from the assist element by supplying a predetermined element energy amount (e.g., intensity) of element energy (e.g., light) to the assist element, for example, the near-field light irradiation element 256" may be referred to as "assisted recording" or "thermally assisted recording."

The near-field light irradiation element 256 defines a track width (or a recording width) by which the write head 15W performs writing, by an irradiation range (or may be referred to as a spot range or a heat distribution width) of near-field light. That is, the track width corresponds to the width of the irradiation range of the near-field light. For example, when the near-field light irradiation element 256 radiates the near-field light in an irradiation range with a width smaller than the width of the write head 15W, the track width of a track written by the write head 15W may be smaller than the width of the write head 15W. When the near-field light irradiation element 256 radiates the near-field light in an irradiation range with a width larger than the width of the write head 15W, the track width of a track written by the write head 15W may be larger than the width of the write head 15W. Thus, when the shape of the near-field light irradiation element 256 is changed due to factors such as heat occurring during irradiation of the near-field light, the irradiation range of the near-field light fluctuates, and accordingly, the track width of the track written by the write head 15W changes. For example, when an element energy (e.g., a current or a voltage) supplied to the assist element, for example, the light generating element 250, is increased, the intensity of the near-field light radiating from the near-field light irradiation element 256 increases so that the thermal assist effect may be enhanced, but the irradiation range may also be widened and the track width may also be increased. For example, when an element energy (e.g., a current or voltage) supplied to the assist element, for example, the light generating element 250, is reduced, the intensity of the near-field light radiating from the near-field light irradiation element 256 decreases so that the thermal assist effect may be reduced, but the irradiation range may also be narrowed and the track width may also be decreased. That is, when an element energy (e.g., intensity of light) supplied to the assist element, for example, the near-field light irradiation element 256, is increased, the thermal assist effect may be enhanced, but the irradiation range may also be widened and the track width may also be increased. When an element energy (e.g., intensity of light) supplied to the assist element, for example, the near-field light irradiation element 256, is decreased, the thermal assist effect may be reduced, but the irradiation range may also be narrowed and the track width may also be decreased.

For example, the recording density/energy controller 630 adjusts (sets or controls) at least one of a BPI and a TPI corresponding to each head 15, and the intensity of laser light to be supplied to the near-field light irradiation element 256 of each head 15. The recording density/energy controller 630 adjusts (sets or controls) at least one of the BPI and the TPI and the intensity of the laser light, for each head 15. The recording density/energy controller 630 adjusts (sets or controls) at least one of the BPI and the TPI and the intensity of the laser light, for each head 15, during variable adjustment of the capacity of the disk 10 in the manufacturing process.

For example, the recording density/energy controller 630 adjusts the BPI corresponding to each head 15 to an initial BPI, adjusts the TPI corresponding to each head 15 to an initial TPI, and adjusts the intensity of the laser light to be supplied to the near-field light irradiation element 256 of each head 15, to an intensity of laser light set as an initial value (hereinafter, may be referred to as an initial intensity) during variable adjustment of the capacity of the disk 10 in the manufacturing process. Also, the recording density/energy controller 630 may adjust the BPI corresponding to each head 15 to the initial BPI, and adjust the intensity of the laser light to be supplied to the near-field light irradiation element 256 of each head 15, to the initial intensity during variable adjustment of the capacity of the disk 10 in the manufacturing process. The recording density/energy controller 630 adjusts the TPI corresponding to each head 15, to the initial TPI, and supplies the initial TPI to each near-field light irradiation element 256 of each head 15 during variable adjustment of the capacity of the disk 10 in the manufacturing process.

For example, when it is determined that the total capacity does not match the target total capacity, the recording density/energy controller 630 selects a target head 15 with a higher priority from the plurality of heads 15, adjusts the BPI corresponding to the target head 15, and adjusts the intensity of the laser light to be supplied to the near-field light irradiation element 256 of the target head 15. The recording density/energy controller 630 repeats a process of selecting the target head 15 from the plurality of heads 15, adjusting the BPI corresponding to the target head 15, and adjusting the intensity of the laser light to be supplied to the near-field light irradiation element 256 of the target head 15 until the total capacity matches the target total capacity.

According to the third embodiment, when it is determined that the total capacity does not match the target total capacity, the magnetic disk drive 1 selects a target head 15 with a higher priority from the plurality of heads 15, adjusts the BPI corresponding to the target head 15, and adjusts the intensity of the laser light to be supplied to the near-field light irradiation element 256 of the target head 15. The magnetic disk drive 1 repeats a process of selecting the target head 15 from the plurality of heads 15, adjusting the BPI corresponding to the target head 15, and adjusting the intensity of the laser light to be supplied to the near-field light irradiation element 256 of the target head 15 until the total capacity matches the target total capacity. Thus, the magnetic disk drive 1 may enhance the reliability.

While certain embodiments have been described, these embodiments have been presented as mere examples, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive, comprising:
a first disk having a first surface;
a second disk having a second surface;
a first head including a first write head configured to write data on the first surface at a first recording density and a first assist element configured to generate a first energy for increasing a write performance by the first write head toward the first surface;
a second head including a second write head configured to write data on the second surface at a second recording density and a second assist element configured to generate a second energy for increasing a write performance by the second write head toward the second surface; and
a controller configured to change at least one of the first recording density and the second recording density based on a first recording capacity up to which the first head is capable of writing on the first disk, a second recording capacity up to which the second head is capable of writing on the second disk, and a target capacity.

2. The magnetic disk drive according to claim 1, wherein the controller changes at least one of a third energy to be supplied to the first assist element and a fourth energy to be supplied to the second assist element based on the first recording capacity, the second recording capacity, and the target capacity.

3. The magnetic disk drive according to claim 2, wherein when a total capacity that is a sum of the first recording capacity and the second recording capacity is greater than the target capacity, the controller reduces at least one of the first recording density and the second recording density and reduces at least one of the third energy and the fourth energy.

4. The magnetic disk drive according to claim 3, wherein when a first change in an amount of a life of the first assist element in response to a change in the third energy is larger than a second change in an amount of a life of the second assist element in response to a change in the fourth energy, the controller reduces the first recording density and the third energy.

5. The magnetic disk drive according to claim 3, wherein when a first ratio of the third energy with respect to a first upper limit energy that is allowed to be supplied to the first assist element is larger than a second ratio of the fourth energy with respect to a second upper limit energy that is allowed to be supplied to the second assist element, the controller reduces the first recording density and the third energy.

6. The magnetic disk drive according to claim 5, wherein the first recording density is a linear recording density.

7. The magnetic disk drive according to claim 6, wherein the controller increases a track density when the first head writes data on the first surface.

8. The magnetic disk drive according to claim 2, wherein when a total capacity including the first recording capacity and the second recording capacity is less than the target capacity, the controller increases at least one of the first recording density and the second recording density and increases at least one of the third energy and the fourth energy.

9. The magnetic disk drive according to claim 8, wherein when a first change in an amount of a life of the first assist element in response to a change in the third energy is smaller than a second change in an amount of a life of the second assist element in response to a change in the fourth energy, the controller increases the first recording density and the third energy.

10. The magnetic disk drive according to claim 8, wherein when a first ratio of the third energy with respect to a first upper limit energy that is allowed to be supplied to the first assist element is smaller than a second ratio of the fourth energy with respect to a second upper limit energy that is allowed to be supplied to the second assist element, the controller increases the first recording density and the third energy.

11. The magnetic disk drive according to claim 10, wherein the first recording density is a linear recording density.

12. The magnetic disk drive according to claim 11, wherein the first recording density is a track density of the data written on the first surface and the second recording density is a track density of the data written on the second surface.

13. The magnetic disk drive according to claim 2, wherein the first assist element and the second assist element are each a spin torque oscillator that is configured to generate high-frequency magnetic fields.

14. The magnetic disk drive according to claim 13, wherein the third energy and the fourth energy are supplied in the form of an electric current.

15. The magnetic disk drive according to claim 2, wherein the first assist element and the second assist element are each a near-field light irradiation element configured to radiate near-field light.

16. The magnetic disk drive according to claim 15, wherein the third energy and the fourth energy are supplied in the form of light.

17. A method of adjusting characteristics of a head of a magnetic disk drive comprising a first disk having a first surface, a second disk having a second surface, a first head including a first write head configured to write data on the first surface at a first recording density, and a first assist element configured to generate a first energy for increasing a write performance by the first write head toward the first surface, and a second head including a second write head configured to write data on the second surface at a second recording density, and a second assist element configured to generate a second energy for increasing a write performance by the second write head toward the second surface, said method comprising:
  determining that a total of a first recording capacity up to which the first head is capable of writing on the first disk and a second recording capacity up to which the second head is capable of writing on the second disk does not match a target capacity; and
  changing at least one of the first recording density and the second recording density based on whether the total is less than or greater than the target capacity.

18. The method according to claim 17, further comprising:
  changing at least one of a third energy to be supplied to the first assist element and a fourth energy to be supplied to the second assist element based on whether not the total is less than or greater than the target capacity.

19. The method according to claim 18, wherein the first recording density is a track density of the data written on the first surface and the second recording density is a track density of the data written on the second surface.

* * * * *

UNITED STATES PATENT AND TRADEMARK OFFICE
CERTIFICATE OF CORRECTION

| | |
|---|---|
| PATENT NO. | : 11,120,822 B2 |
| APPLICATION NO. | : 17/003728 |
| DATED | : September 14, 2021 |
| INVENTOR(S) | : Masaya Ohtake et al. |

It is certified that error appears in the above-identified patent and that said Letters Patent is hereby corrected as shown below:

On the Title Page

Item (72), please replace "Masaya OHTAKE, Kanagawa" with --Masaya OHTAKE, Fujisawa Kanagawa--.

Item (72), please replace "Akihiko TAKEO, Tokyo" with --Akihiko TAKEO, Kokubunji Tokyo--.

In the Claims

In Column 40, Line 35, please replace "not the total" with --the total--.

Signed and Sealed this
Twenty-fifth Day of October, 2022

*Katherine Kelly Vidal*

Katherine Kelly Vidal
*Director of the United States Patent and Trademark Office*